United States Patent [19]

Cezzar

[11] Patent Number: 5,469,550
[45] Date of Patent: Nov. 21, 1995

[54] REVERSIBLE COMPUTER APPARATUS AND METHODS OF CONSTRUCTING AND UTILIZING SAME

[76] Inventor: Ruknet Cezzar, 250 N. First St., Hampton, Va. 23664

[21] Appl. No.: 826,778

[22] Filed: Jan. 28, 1992

[51] Int. Cl.$^6$ .................................................. G06F 9/30
[52] U.S. Cl. ................................ 395/375; 364/DIG. 1; 395/800
[58] Field of Search ................................ 395/375, 800, 395/500, 775

[56] References Cited

U.S. PATENT DOCUMENTS

| | | | |
|---|---|---|---|
| 3,794,979 | 2/1974 | McMahon | 395/375 |
| 4,085,450 | 4/1978 | Tulpule | 395/800 |
| 4,176,394 | 11/1979 | Kaminski et al. | 395/375 |
| 4,881,228 | 11/1989 | Shouda | 371/19 |
| 5,129,079 | 7/1992 | Miyashita | 395/575 |

FOREIGN PATENT DOCUMENTS

| | | |
|---|---|---|
| 62-237533 | 4/1988 | Japan. |
| 63-24424 | 7/1988 | Japan. |
| 0250228 | 5/1990 | Japan. |
| 03-158937 | 10/1991 | Japan. |

OTHER PUBLICATIONS

Tanenbaum, "Structured Computer Organization", Prentice–Hall 1984, pp. 10–12.
Agrawal et al, "An Execution–Backtracking Approach to Debugging", IEEE, May 1991, pp. 21–26.
"Reverse Execution in a Generalized Control Regime", LaFora Computer Languages, vol. 9, No. 3–4, 1984, pp. 183–192.
"Reversible Execution", Zelkowitz, ACM Inc, vol. 16, No. 9 Sep. 1973, p. 566.
"The Cope User Interface", Conway, IEEE, 1982, pp. 614–615.
"Igor: A System for Program Debugging via Reversible Execution", Feldman et al, ACM Inc., vol. 26, No. 1, 1989, pp. 112–123.

Primary Examiner—Parshotam S. Lall
Assistant Examiner—Viet Vu
Attorney, Agent, or Firm—Larson and Taylor

[57] ABSTRACT

A computer apparatus having a unique architecture which is capable of both forward and reverse execution modes. The reverse execution mode is implemented at the machine language level, and relies on an internal stack in micromemory or the microprocessor's stack pointer register for data saving purposes. A unique instruction set design is employed which includes a plurality of forward execution instructions and complementary reverse execution instructions of opposite sense. During the reverse execution mode, the reverse execution instructions are implemented in a logical flow which is substantially the reverse of that used during the forward execution mode.

9 Claims, 19 Drawing Sheets

FIG. 2A

```
                    BINARY-TO-ASCII

OUT:    MOV     #5, R0                  ; LOOP COUNT
LOOP:   MOV     R1, -(SP)               ; COPY WORD INTO STACK
        BIC     #177770, @SP            ; ONE OCTAL VALUE
        ADD     #'0, @SP                ; CONVERT TO ASCII
        MOVB    (SP)+, -(R2)            ; STORE IN BUFFER
        ASR     R1                      ; SHIFT
        ASR     R1                      ;   RIGHT
        ASR     R1                      ;     THREE
        DEC     R0                      ; TEST IF DONE
        BNE     LOOP                    ; NO, DO IT AGAIN
        BIC     #177776, R1             ; GET LAST BIT
        ADD     #'0, R1                 ; CONVERT TO ASCII
        MOVB    R1, - (R2)              ; STORE IN BUFFER
        RTS     PC                      ; DONE, RETURN
```

FIG. 2B

```
                    ASCII-TO-BINARY

MOVB    + (R2), R1              ; GET LAST CHAR FROM BUFFR
        SUBB    #'0, R1                 ; CONVERT TO BINARY
        BIS     #000001, R1             ; SET RIGTMOST BIT (NOP)
LOOP:   INC     R0                      ; TEST IF DONE -(R0=5?)
        ASL     R1                      ; SHIFT
        ASL     R1                      ;   LEFT
        ASL     R1                      ;     THREE
        MOVB    +(R2), -(SP)            ; POINT TO NEXT TO LAST
        SUBB    #'0, @SP                ; CONVERT TO BINARY
        BIS     #000007, @SP            ; SET RIGTMOST BITS (NOP)
        MOV     (SP)+, R1               ; GET VALUE ON R1
        BRC     LOOP                    ; GO TO LOOP (IF R0 < 5)
        RTS     PC                      ; DONE, RETURN
``` a) Perfectly Invertible (Reversible) Procedures b) Noninvertible (Irreversible) Procedures c) Noninvertible Prodecures with Redefined Inputs/Outputs.

FIG. 5

(Part 1)
Instruction Format:
31 .... 28 ................... 16 ..................... 4 ..... 0

| OP | SRC | DST | TY |
|----|-----|-----|-----|

OP    Operation Code. This 4-bit (= one hex digit) area indicates one of 16 generic operations. For example, the generic step operation means increment or decrement depending on whether the bit in TY field is 0 or 1.

SRC   Normally indicates the source address of th Operand 1. The addresses 1 thru 17 correspond to registers 1-17. In some cases, such as machine control instructions, this area is used to augment or extend the op code.

DST   Normally indicates the destination address of Operand 2. The addresses 1 thru 17 correspond to the register set. Again, in some cases this area augments the operation.

TY    This is the type field where only bit 0 is implemented. If false (0), the operation is to be interpreted in its "normal" sense (increment, add, etc). If true (1), the instruction is to be interpreted in opposite sense (e.g. decrement, subtract, etc). The run-time decoding of the instruction depends upon XOR'ing of this bit with the execution mode (forward/reverse) bit of PS register.

(Part 2)
* Processor Status Register:

| P | V | C | X | H | L | F | E |
|---|---|---|---|---|---|---|---|

Although only the rightmost eight bits are to be used in actual implementation, this register is simulated in groups of 4 bits corresponding to hexadecimal (or decimal) values 0 or 1. When set to 1, the status flag indicates the true condition. When set to 0, it indicates the false condition. Details:

E:  Execution Mode  (0: Forward, 1: Reverse)
F:  Save/Flush Mode (0: Save,    1: Flush )
L:  Result Low   (1: Result equals zero,     0: Otherwise)
H:  Result High  (1: Result equals high value, 0: Otherwise)
X:  Context  (1: Limited-- Registers, 0: Normal--Memory & regs)
C:  Carry      (1: Arithmetic carry,    0: No carry)
V:  Overflow   (1: Arithmetic overflow, 0: No overflow)
P:  Parity     (1: If parity error,    0: Otherwise)

* Only those flags relevant to the discussion are simulated.

FIG. 6A

| OpCode (Hex) | Mnemonic (Assy L) | Generic Function | XOR (D+E) | Description |
|---|---|---|---|---|
| 0 | NOP | No Operation | 0,1 | PC <- PC + STEP |
| 1 | INP | (save &) Input or | 0 | -(msp) <- AC<br>AC <- D[DST] |
|  | OUT | Output (& restore) | 1 | D[DST] <- AC<br>AC <- (msp)+ |
| NOTE: If [DST] = 0 interactive input from keyboard or output to screen. Otherwise, DST and D[DST] are device address and content. | | | | |
| 2 | CPI | Copy Immediate | 0 | -(msp) <- [DST]<br>[DST] <- SRC |
|  | RSI | Restore Immediate | 1 | [DST] <- (msp)+ |
| 3 | CPY | Copy (Load/Store) | 0 | -(msp) <- [DST]<br>[DST] <- [SRC] |
|  |  | Restore | 1 | [DST] <- (msp)+ |
| 4 | EXC | Exchange (Move)<br>Indirect exchange | 0,1 | [SRC] <-> [DST]<br>[XX] <-> [YY] |
| NOTE; If SRC or DST or both are 0005 or 0006 (index registers) the exchange occurs between values pointed to by the XX or YY index registers. | | | | |
| 5 | INC | Step up or | 0 | [DST] <- [DST]+1 |
|  | DCR | Step down | 1 | [DST] <- [DST]-1 |
| NOTE: The condition flags of PS register are updated after op. | | | | |
| 6 | JMP | Jump Unconditional<br>(If SRC = 0) | 0 | PC <- DST |
|  | BRA | Conditional Branch<br>(IF SRC <> 0) |  | PC <- DST if<br>PS Flag zero. |
|  | STY | Stay otherwise | 1 | PS <- PS + STEP |
| NOTE: There are various conditional branches. BNE is used most frequently. This sets PC to destination address if Z flag is 0. Z (zero) flag is set, in turn, when [DST] = 0 or [DST] = [SRC]. | | | | |
| 7 | JSR | Jump to Sub-start | 0 | -[SP] <- PC<br>PC <- SRC |
|  |  | Jump to Sub-end | 1 | -[SP] <- PC<br>PC <- DST |

FIG. 6B

| OpCode (Hex) | Mnemonic (Assy L) | Generic Function | XOR (D+E) | Description |
|---|---|---|---|---|
| 8 | RTS | Return from Sub-end<br>Retrn from Sub-start | 0<br>1 | PC <- [SP]+<br>PC <- [SP]+ |
| 9 | ADD<br>SUB | Add<br>Subtract | 0<br>1 | [DST] <- [DST]+[SRC]<br>[DST] <- [DST]-[SRC] |
| A | SHL<br>SHR | Arith. Shift Left<br>Arith. Shift Right | 0<br>1 | [DST] <- 2 * [DST]<br>[DST] <- [DST] / 2 |
| | NOTE: If [DST] is odd, overflow flag V is set on shift right.<br>If 2 * [DST] exceeds highest integer (e.g. 32767) then overflow<br>flag V is set on shift left. | | | |
| B | PSH<br>POP | Push unto stack<br>Pop from top of stack | 0<br>1 | -[SP] <- [DST]<br>[DST] <- [SP]+ |
| C | CMP | Compare and set flags<br>Nothing otherwise | 0<br>1 | Set PS Flags E,Z,C,..<br>Just mark location |
| D | AND | Bitwise AND Operation<br>BIC: Bit clear from src<br>Restore destination | 0<br><br>1 | -(msp) <- [DST]<br>[DST] <- [DST] and [SRC]<br>[DST] <- (msp)+ |
| E | IOR | Inclusive OR Operation<br>BIS: Bit set from src<br>Restore destination | 0<br><br>1 | -(msp) <- [DST]<br>[DST] <- [DST] or [SRC]<br>[DST] <- (msp)+ |
| F | | Machine Control and Miscellaneous Operations: | | |
| | HLT<br>STA | (If SRC=DST=0) | 0<br>1 | Halt in forw/revs mode<br>Start in forw/rev mode |
| | RVS | (If SRC=DST=HIGH) | 0,1 | Reverse the PS E flag |
| | NOT | (If SRC= High Value) | 0,1 | [DST] <- NOT [DST] |
| | XOR | (Otherwise) | 0,1 | [DST] <- [DST] xor [SRC] |

FIG. 7

```
DEMO.MAC: Program Listing and Sample Dialogue

Program Listing:

LOC    OP SRC DST D      Comments

0001   F000000001       ; HLT (reverse)
** 2   1000000000       ; INP AC, <- num
** 3   2099900100       ; CPI #999, RA   (immed)
** 4   3000300120       ; CPY AC, RC
   5   4001000110       ; EXC RA, RB
   6   5000000130       ; INC RD
   7   6000000100       ; JMP 10 (forward)
   8   1000000000       ; INP AC (unreachable)
   9   1000000001       : OUT AC (unreachable)
0010   6000000070       ; JMP 7  (reverse)
  11   7002000230       ; JSR 15, 20 (start/end)
  12   9001000130       ; ADD RA, RD
  13   A000000130       ; SHL RD
  14   B000400030       ; PSH SP-, AC (push)
  15   C001000110       ; CMP RA, RB (set H,L)
**16   D000300130       ; AND AC, RD
**17   E000200140       ; IOR PS, RE
  18   F000000000       ; HLT (forward)
  19   1000000001       ; OUT AC (unreachable)
0020   8000000001       ; RET (rtn from start)
**21   3001200030       ; CPY RC, AC
  23   1000000001       ; OUT AC,-> (as well)
** These instructions are destructive and
   automatically saves the destination if
   F flag is 0.
```

Sample Dialogue:

input? 12345
    ¦--j-->  ¦--s-->   /* indicates jump and jump to subroutine
halted at PC  18
   Generating log file LOG.DAT for demo.mac Please stand by...
MAcroStack:
     SP          CONTENT       /* this list the hardware stack
   -------      -------
   4094:         [12345]       /* the number was pushed on stack
   4095:         [   -1]       /* bottom of stack marked with -1

MIcroStack:                    /* internal stack for auto data saves
   ¦\ _____ 0 _____ /¦
   ¦\ _____ 2792 _____ /¦
                0 etc.

~~~~~~~~~~~~~~~~~~~~~~~~~~~
   MIcroStack Size: 5  Max Stack Size: 5  Ratio to Op_Cnt: 25 %

FIG. 8

```
Machine language program name -- [maxlength 10?  sum.mac
17 instructions loaded into program memory
execute forward (0) or reverse (1)?  0
set save mode (0) or flush mode (1)?  0
context normal (0) or limited (1)?  0
Started at PC    1  >== Forward ==> input? 5         /* number of values to be added */ input? 1111      /* first integer value           */ input? 2222      /* second value                  */ input? 3333      /* ...                           */ input? 4444      /*                               */ input? 5555      /* fifth value                   */ output 16665
```

FIG. 9

| EXEC MODE (Frw/Rvs) | INFIL.DAT (Inp or Out) | CONGEN.MAC (Program) | OUTFIL.DAT (Out or Inp) | NOTES |
|---|---|---|---|---|
| Forward | 1 7 7 7 | >==Forward==> | 1023 | MSB in |
| " | 2 1 2 7 | " | 1111 | " " |
| " | 4 2 5 6 | " | 2222 | " " |
| " | 6 4 0 5 | " | 3333 | " " |
| " | 7 7 7 7 | " | 4095 | " " |
| Reverse | 4095 | <==Reverse==< | 7 7 7 7 | LSB out |
| " | 3333 | " | 5 0 4 6 | " " |
| " | 2222 | " | 6 5 2 4 | " " |
| " | 1111 | " | 7 2 1 2 | " " |
| " | 1023 | " | 7 7 7 1 | " " |

FIG. 10

| General ASC-BIN and BIN-ASC Routine | | |
|---|---|---|
| 0001 | F000000001 | ; HLT reverse |
| 0002 | 2000000120 | ; CPI 0, RC |
| 0003 | 2000300070 | ; CPI 3, R7 |
| 0004 | 6099900141 | ; BRA (mark for cond branch) |
| 0005 | C000000071 | ; CMP (using M(0) and R7 reg) |
| 0006 | 1000300000 | ; INP 007, AC (get octal digit) |
| 0007 | D001200031 | ; AND RC, AC |
| 0008 | 2000700031 | ; CPI 7, AC |
| 0009 | E000300120 | ; OR AC, RC |
| 0010 | A000000120 | ; SHL RC |
| 0011 | A000000120 | ;   SHL RC |
| 0012 | A000000120 | ;     SHL RC |
| 0013 | 5000000071 | ; DEC ZZ |
| 0014 | C000000070 | ; CMP (using M(0) and R7) |
| 0015 | 6099900040 | ; BRA (branch when not zero) |
| 0016 | 1000000000 | ; INP 000, AC (last digit) |
| 0017 | D001200031 | ; AND RC, AC |
| 0018 | E000300120 | ; OR AC, RC |
| 0019 | 2000700031 | ; CPI 7, AC |
| 0020 | 4000300120 | ; EXC AC, RC |
| 0021 | 1000300001 | ; OUT AC, num |
| 0022 | F000000000 | ; HLT forward |

FIG. 11C
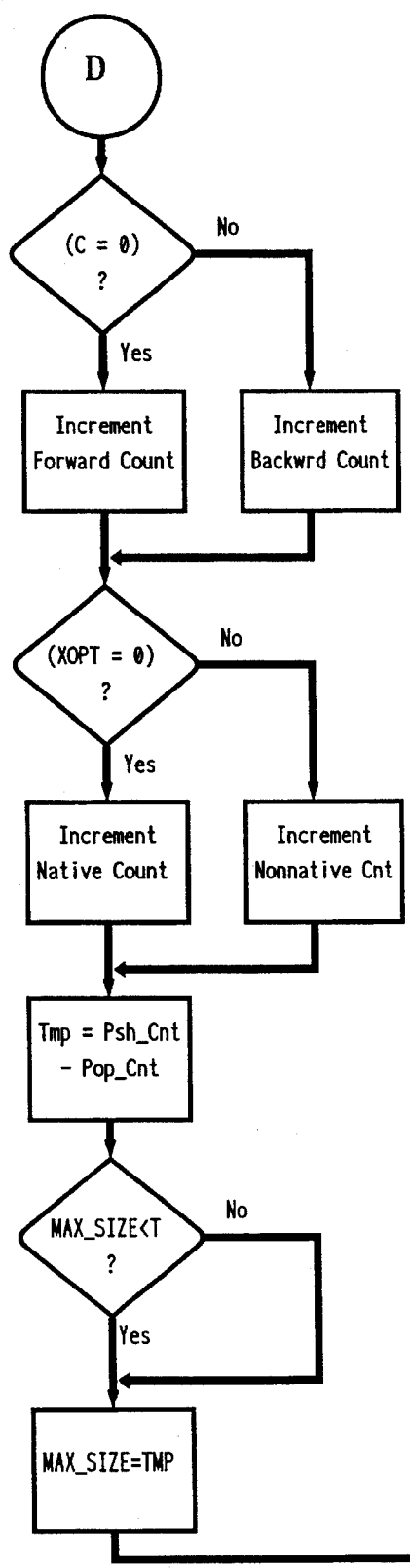
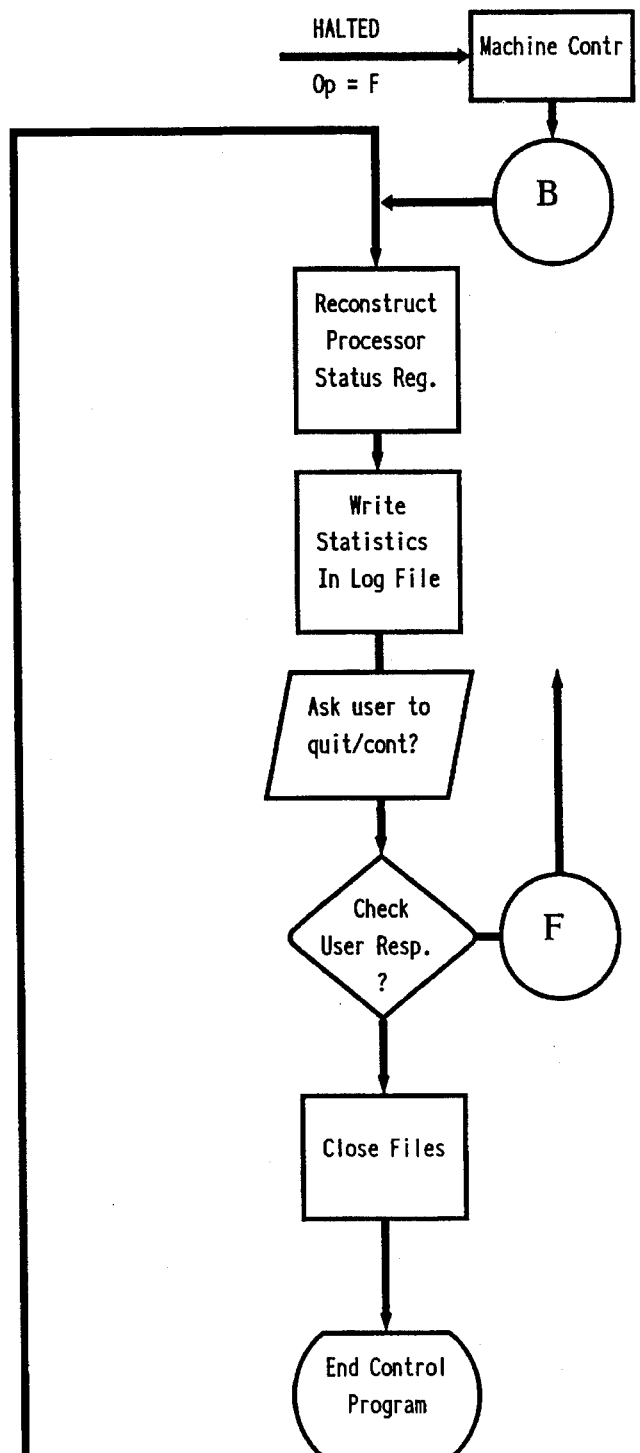

REVERSIBLE COMPUTER APPARATUS AND METHODS OF CONSTRUCTING AND UTILIZING SAME

BACKGROUND OF THE INVENTION

1. Field of the Invention

The present invention relates generally to a reversible computer apparatus having a unique architecture, including appropriate microprocessor hardware and programming, which is capable of executing instructions not only in a standard forward execution mode, but also in a reverse execution mode. More particularly, the invention provides reversible execution which may be implemented at the machine language level, relying on an internal stack in micromemory or the microprocessor's stack pointer register for data saving purposes, i.e., whereby a value normally overwritten during forward execution may be saved on an internal stack associated with instruction decoding for use in reverse execution mode when desired.

The invention also contemplates a unique instruction set design in which for every forward-mode instruction there is an essentially opposite, complementary reverse-mode instruction. The complementary reverse-mode instructions are used in the reverse execution mode, following a logical flow which is essentially the reverse of that used during forward execution mode. When one or more pairs of complementary forward- and reverse- mode instructions are executed, the internal state of the computer is left substantially intact.

The terminology "internal state" as employed herein is intended to refer to the various internal elements of a computer, including the microprocessor registers, memory, and secondary storage contents affecting computations.

The terminology "stack" as employed herein is intended to connote an internal stack in micromemory created by suitable programming, such as a Turbo Pascal dynamic stack. Alternatively, a stack may be simulated by implementing the microprocessor's stack pointer register with PSH (push data into stack) and POP (pop data from top of stack) instructions in the machine design, for example.

2. Description of the Relevant Art

A major problem caused by software failures is the loss of data which has been input but not yet stored in memory. A user operating the computer system may have to spend many frustrating hours inputting data to return the system to the state it was in just prior to the crash. Similar difficulties arise when, for example, the hard disk unit on a personal computer is repartitioned and all data is inadvertently lost, or when other similar inadvertent destructive operations occur.

If a computer system were capable of operating in reverse, it would be possible for the system to return itself to the state it was in just prior to a software failure or other destructive operation resulting in data loss. Reversible execution would also permit diagnosis of any unexpected input which may have caused a software failure. While a full reverse execution mode has not heretofore been attainable, efforts have been made to permit limited opposite-mode execution in the form of "undo" or "redo" previous command features. Examples of such undo or redo previous commands include the UNIX visual text editor's undo (ESC u) feature, Korn Shell's previous history feature, and the VMS "arrow back" and "arrow forward" features. Although such known features demonstrate the desirability of having the system operate in an opposite direction, they are of limited utility inasmuch as they permit going back only one step or one line.

It has been suggested that reverse computations may be capable of being performed at the level of logic gates, i.e., Fredkin gates, and that reversible Turing machines may be feasible. See Bennett, C. H. and Landauer, R. "The Fundamental Physical Limits of Computation," *Scientific American*, Vol. 253 (July 1985). At the other extreme, it has been suggested that reversible programs and procedures may be attainable with higher symbolic language levels. See Briggs, J. S., "Generating Reversible Programs," *Software—Practice and Experience*, Vol. 17 (7), (July 1985). This latter work discusses undoing actions, as well as the possibility of perfectly invertible procedures which are suitable for functions having meaningful logical opposites.

Other known microprocessor and/or computer control systems, while not disclosing or suggesting the reversible execution features of the present invention, are described in the following United States patents. U.S. Pat. No. 4,434,461 issued in 1984 to Puhl entitled "Microprocessor with Duplicate Registers for Processing Interrupts" discloses a microprocessor architecture for controlling cellular radiotelephone transceivers, including duplicate microprocessor registers which are switched over to during interrupts. U.S. Pat. No. 4,910,660 issued in 1990 to Li entitled "Self-Optimizing Method and Machine" discloses a method for self-optimizing an object relative to a specific criterion in response to variations on a number of variables, in which statistically designed tests are performed to determine the combination of variables optimizing the specific criterion in repeating optimizing cycles. U.S. Pat. No. 5,006,992 issued in 1991 to Skeirik entitled "Process Control System with Reconfigurable Expert Rules and Control Modules" discloses a process control system having a supervisor procedure configured as a modular software structure which defines control parameters for various process control procedures and retrieves data from various sources including a historical database.

The present invention provides a computer apparatus having an underlying machine architecture capable of full reverse execution of instructions, in which operations are concretely defined at the machine language level.

SUMMARY OF THE INVENTION

The invention provides a reversible computer apparatus capable of executing instructions in both a forward execution mode and a reverse execution mode, and includes a microprocessor means having a plurality of registers, program memory and data memory. The program memory is programmed at the machine language level to incorporate an instruction set comprising a plurality of forward execution instructions and complementary reverse execution instructions, the reverse execution instructions being of opposite sense relative to the forward execution instructions. Stack means are provided for saving data values which are overwritten during forward execution decoding, whereby the saved overwritten values may be restored as necessary during reverse decoding. The program memory is further programmed such that the apparatus is selectively operable in a forward execution mode which implements the forward execution instructions in a forward logical flow, and a reverse execution mode which implements the reverse execution instructions in a reverse logical flow which is substantially the opposite of the forward logical flow.

In a preferred embodiment of the invention, the program memory includes micromemory which is programmed to define an internal stack which may be selectively enabled to automatically save data before destructive operations during the forward execution mode, whereby the saved data may be restored during the reverse execution mode. The internal stack in micromemory is enabled and disabled via a flag of the processor status register of the microprocessor, so as to selectively automatically save data before destructive operations, while the stack pointer register of the microprocessor is implemented as a simulated stack when the internal stack in micromemory is disabled.

The above and further objects, details and advantages of the invention will become apparent from the following detailed description, when read in conjunction with the accompanying drawings.

BRIEF DESCRIPTION OF THE DRAWINGS

FIGS. 2A and 2B depict exemplary PDP-11 assembler routines corresponding to binary-to-ASCII and ASCII-to-binary conversions, respectively.

FIG. 5 sets forth instruction formats and the processor status (PS) register in accordance with the invention.

FIGS. 6A and 6B comprise a list of operation codes for use in the reversible computer apparatus of the invention.

FIG. 7 shows an exemplary program with sample dialogue which illustrates branch and subroutine call constructs according to the invention.

FIG. 8 depicts an exemplary reversible program for summing n integers in accordance with the invention.

FIG. 9 illustrates the general format of a routine for converting from ASCII-to-binary and binary-to-ASCII in accordance with the invention.

FIG. 10 depicts an exemplary reversible conversion program for the routine shown in FIG. 9, i.e., for converting ASCII-to-binary and vice versa.

FIGS. 11A–11I show a flowchart for a reversible machine control program in accordance with the invention.

DETAILED DESCRIPTION OF THE PREFERRED EMBODIMENTS

Figure 1:
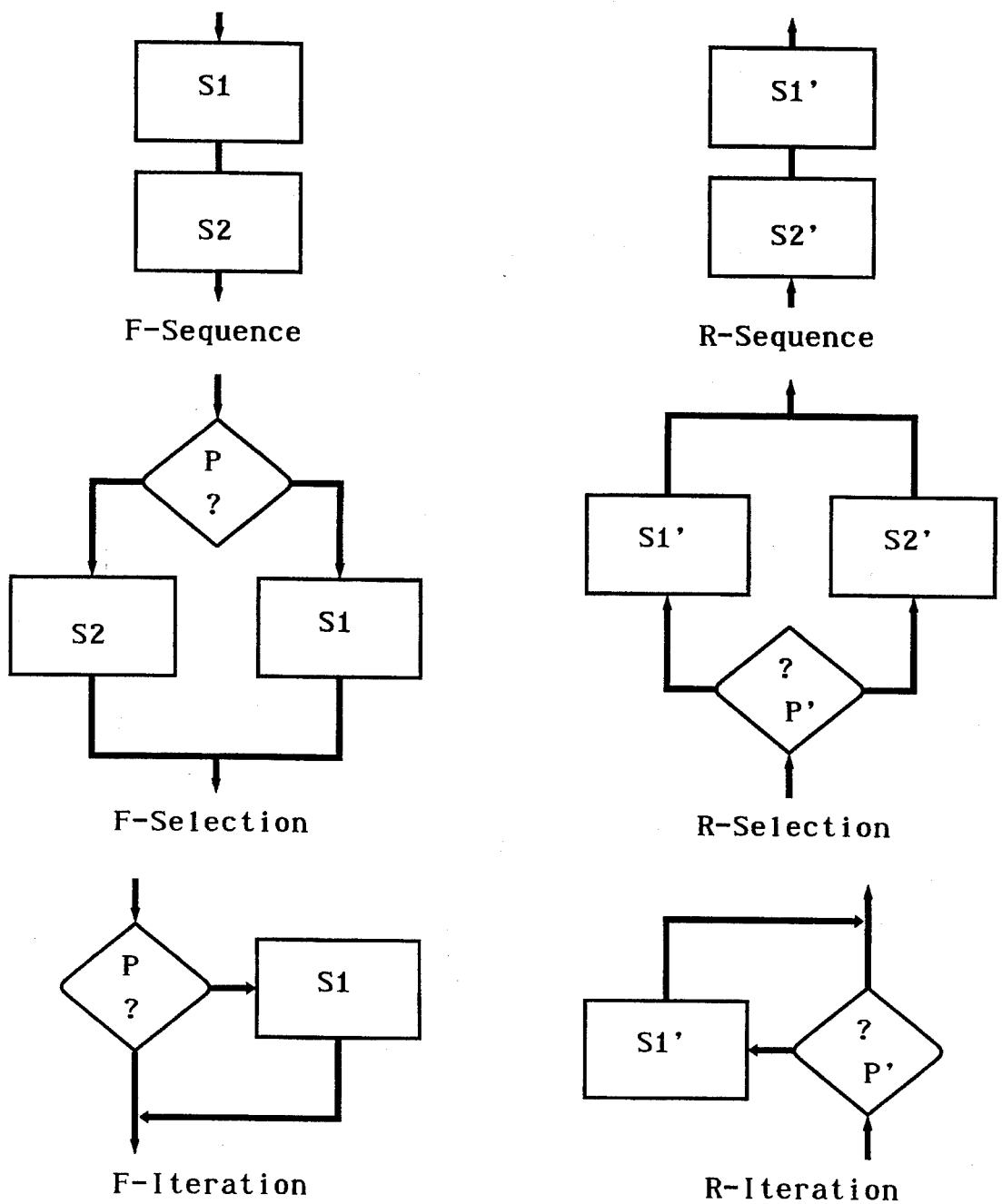
FIG. 1 illustrates, by way of example, forward and reverse logic flow structures for high-level language programs.

A rudimentary understanding of reversible execution by means of high-level language programming may be understood with reference to FIG. 1 showing standard forward-mode logic flow structures on the left-hand side and reverse-mode logic flow structures on the right-hand side. If, for example, a first program (PROG1) reads an input file, formats the records in some manner, and writes them into an output report file, the second or reverse program (PROG2) would do essentially the opposite. PROG2 would read the formatted output file and reproduce the input file., using the reverse logical flow or PROG1 and opposite statements. FIG. 1 shows exemplary complementary control structures which might be employed for PROG1 and PROG2.

An understanding of reversible execution by means of assembly language programming, and the problems which might be encountered therewith, may be understood with reference to FIGS. 2A and 2B. FIG. 2A lists a PDP-11 assembler routine corresponding to a binary-to-ASCII conversion, while FIG. 2B lists a PDP-11 assembler routine corresponding to an ASCII-to-binary conversion. The program shown in FIG. 2A converts a 16-bit binary value into the corresponding 6-character ASCII string, as disclosed in the PDP-11 *Processor Handbook* published by Digital's Sales Support Literature Group of Maynard, MA, at pp. 114–115. The program shown in FIG. 2B does the opposite, reading the 6 ASCII digits from the buffer used by the first program and converting them into a 16-bit unsigned binary number. These examples are simplified versions of conversion routines disclosed in Gill, A., *Machine and Assembly Language Programming* of the PDP-11, published by Prentice-Hall, Inc. of Englewood Cliffs, N.J. (1978), at pp. 99–135.

While a basic comprehension of reverse logic flow and complementary statements can be gleaned from FIGS. 2A and 2B, it will be understood by those skilled in the art that it has heretofore been impossible to use just one routine to accomplish both conversions with a single program. It is a principle object of the present invention to provide an underlying machine architecture which is capable of doing so.

In accordance with a preferred embodiment of the invention, reversibility is accomplished at the machine language level, at which operations are concretely defined. Most known machine languages already incorporate complementary instructions which implement opposite functions, such as ADD/SUB, LOA/STO, INC/DCR, PSH, POP, etc. Forward and reverse executions are achieved by means of a unique instruction set which fully implements opposite instructions. Reverse coding techniques, analogous to reentrant code development, are also employed.

Generally, reverse execution entails executing instructions in reverse sequence and in opposite sense, which can best be understood by the following example. For the following typical machine-language instruction:

(1) 100: ADD R1, R2    Add content of Register 1 to the content of Register 2 the Program Counter (PC) register is incremented and finds the instruction in location 100 during standard forward execution mode. In reverse execution mode, the PC is decremented and the same instruction is found at location 100, however, the instruction is decoded as follows:

(2) 100: SUB R1, R2    Subtract content of Register 1 from the content of Register 2.

Because an instruction may overwrite a location's content which may be needed later, a complementary instruction which restores the location's previous content is required for optional reversal of the entire execution sequence.

To this end, the overwritten value is saved by an internal stack associated with instruction decoding, whereby values saved or "pushed" during forward decodings are restored during reverse decodings. Preferably, the internal stack in which overwritten values are saved is part of the machine language design involving microprogramming memory. In the preferred embodiment of the invention, Turbo Pascal's dynamic stack is employed for this purpose (hereinafter "microstack" or "MIS"), rather than the hardware stack pointed to by the microprocessor's stack pointer (SP) register. Alternatively, information can be saved and restored by a simulated stack (hereinafter "macrostack" or "MAS") which implements the microprocessor's stack pointer (SP) register with PSH and POP instructions in the machine design.

It will be understood that saving of data before destructive operations is generally optional rather than automatic. The automatic saving of data for data-destroying instructions is not always warranted, and in some instances may not be desirable. Thus, rather than automatically saving data involved in destructive operations on the MIS stack, data may be saved using the MAS which is implemented via the conventional hardware SP register and PSH/POP operations.

For data transfer operations, when it is desired to move rather than to copy data, the invention contemplates that exchange (EXC) instructions be employed to simply swap data items. The exchange may also be employed with respect to input-output operations involving data transfers between primary and secondary memories, either as an exchange of the content of the accumulator (AC) register used for INP/OUT instructions with the data in the device address, or as an exchange of blocks of relevant data if the direct memory access (DMA) is employed.

To implement unconditional jumps, conditional branches, subroutine calls, and returns from subroutines, in which data destruction is not an issue, the invention provides for bracketed (dual) transfers of control via sets of jump/stay instructions such as:

---

100: JMP-F 200   Jump unconditionally to location 200 only when in forward execution mode.
...
200: JMP-R 100   Jump unconditionally to location 100 only when in reverse execution mode.

---

The second instruction is a NOP (no operation) in forward mode, while the first instruction is a NOP in reverse mode. Conditional branches, subroutine jumps and returns are similarly implemented using bracketing, involving pairs of instructions suitably placed and decoded to provide the intended result during forward and reverse executions.

Figure 3A:
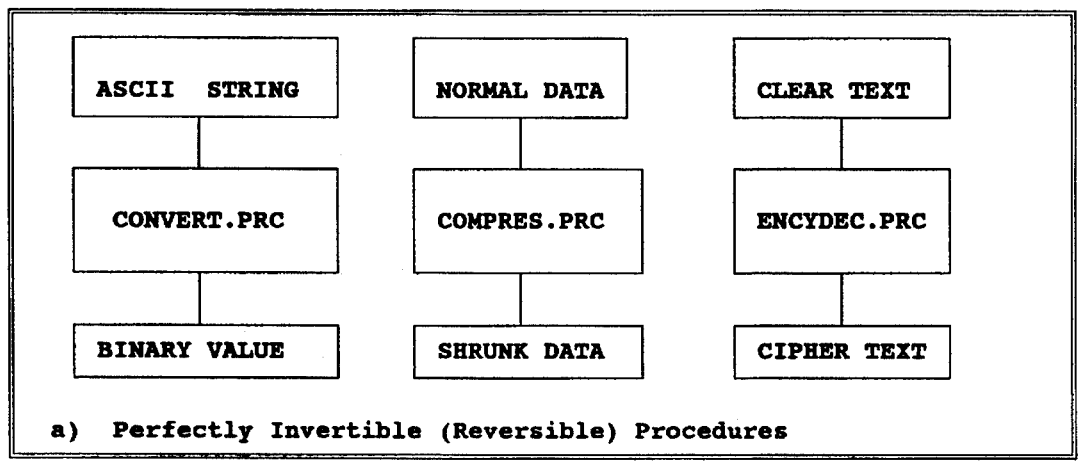
FIGS. 3A–3C depict examples of perfectly invertible/reversible procedures, noninvertible/irreversible procedures, and noninvertible procedures with redefined inputs/outputs, respectively.
Figure 3B:
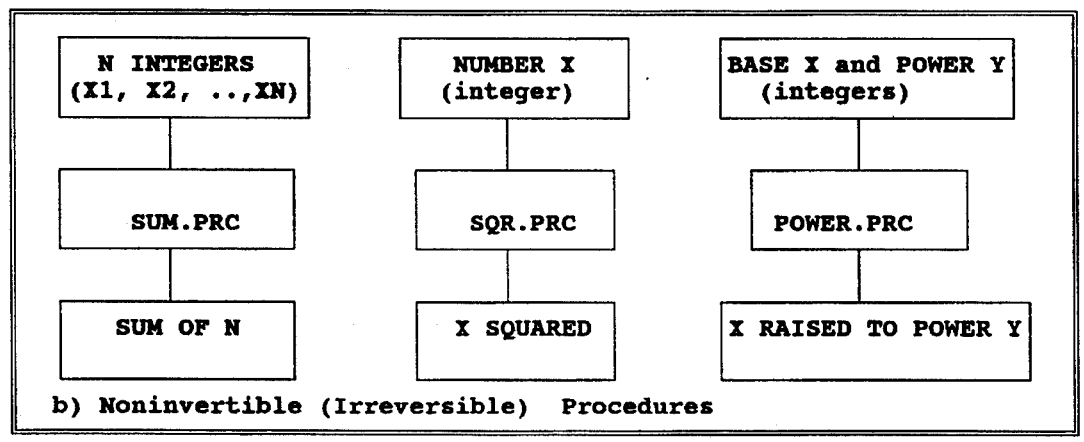
Figure 3C:
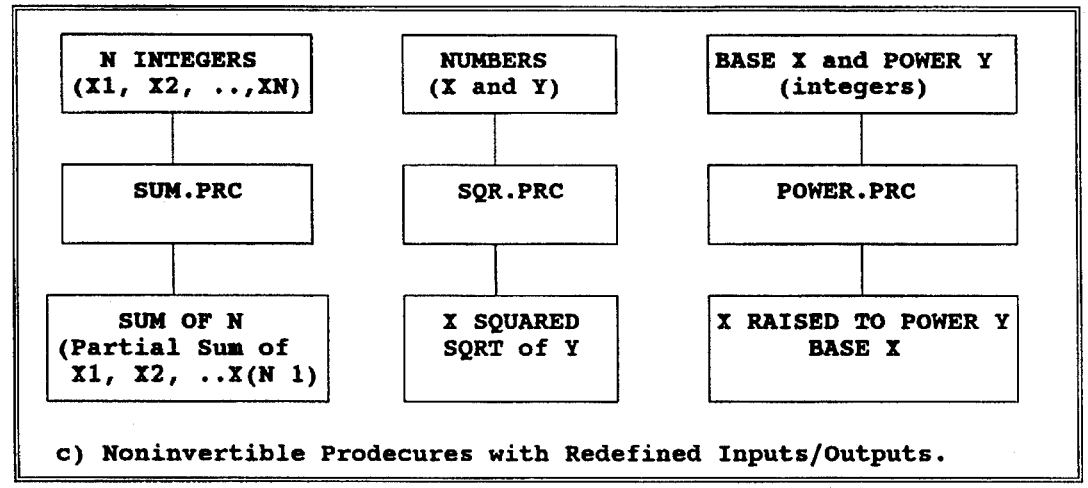

With reference to FIGS. 3A–3C, it will be understood that perfectly reversible procedures for generalized opposite functions is generally limited to situations in which the output is sufficient for regenerating the input. The functions shown in FIG. 3A comprise typical examples involving no loss of information when an output is produced for a given input, and vice versa, so that generalized reversible procedures for these functions may be readily implemented as described more fully below. The examples shown in FIG. 3B, however, involve outputs which contain insufficient information for reproducing the inputs. The invention contemplates, however, that the inputs and outputs of these functions may be redefined as shown in FIG. 3C, so that reversibility may be achieved.

Figure 4:
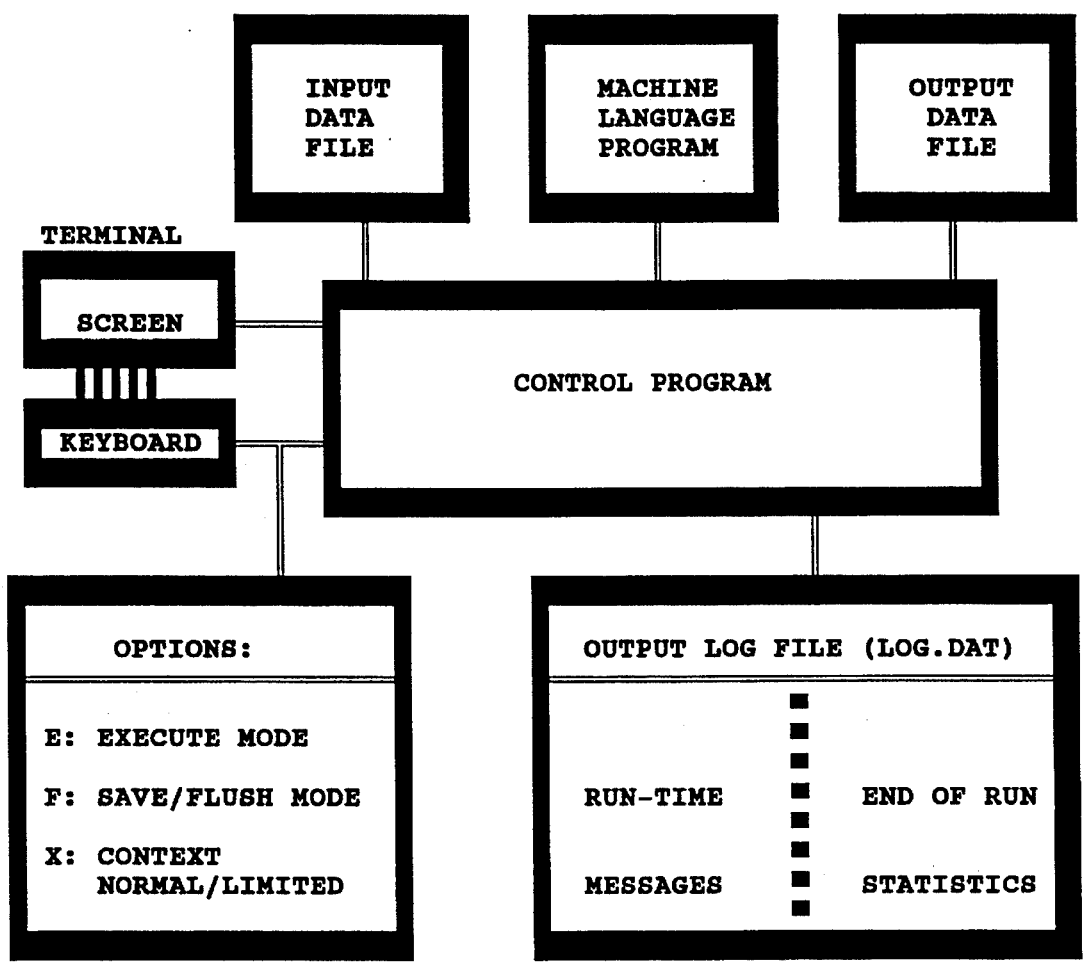
FIG. 4 schematically shows a reversible computer apparatus according to the invention, showing the software architecture therefor.
Figure 11A:
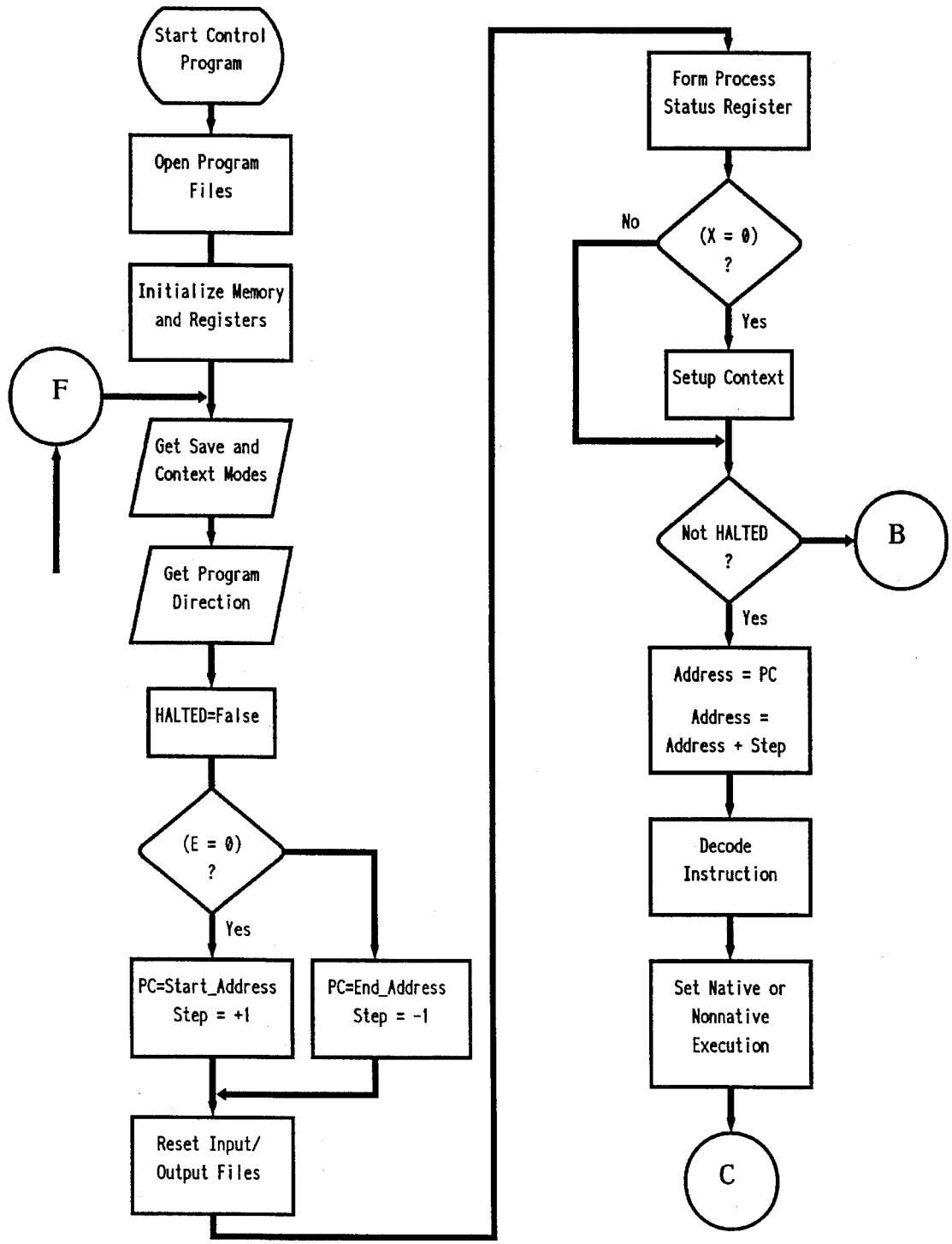
Figure 11B:
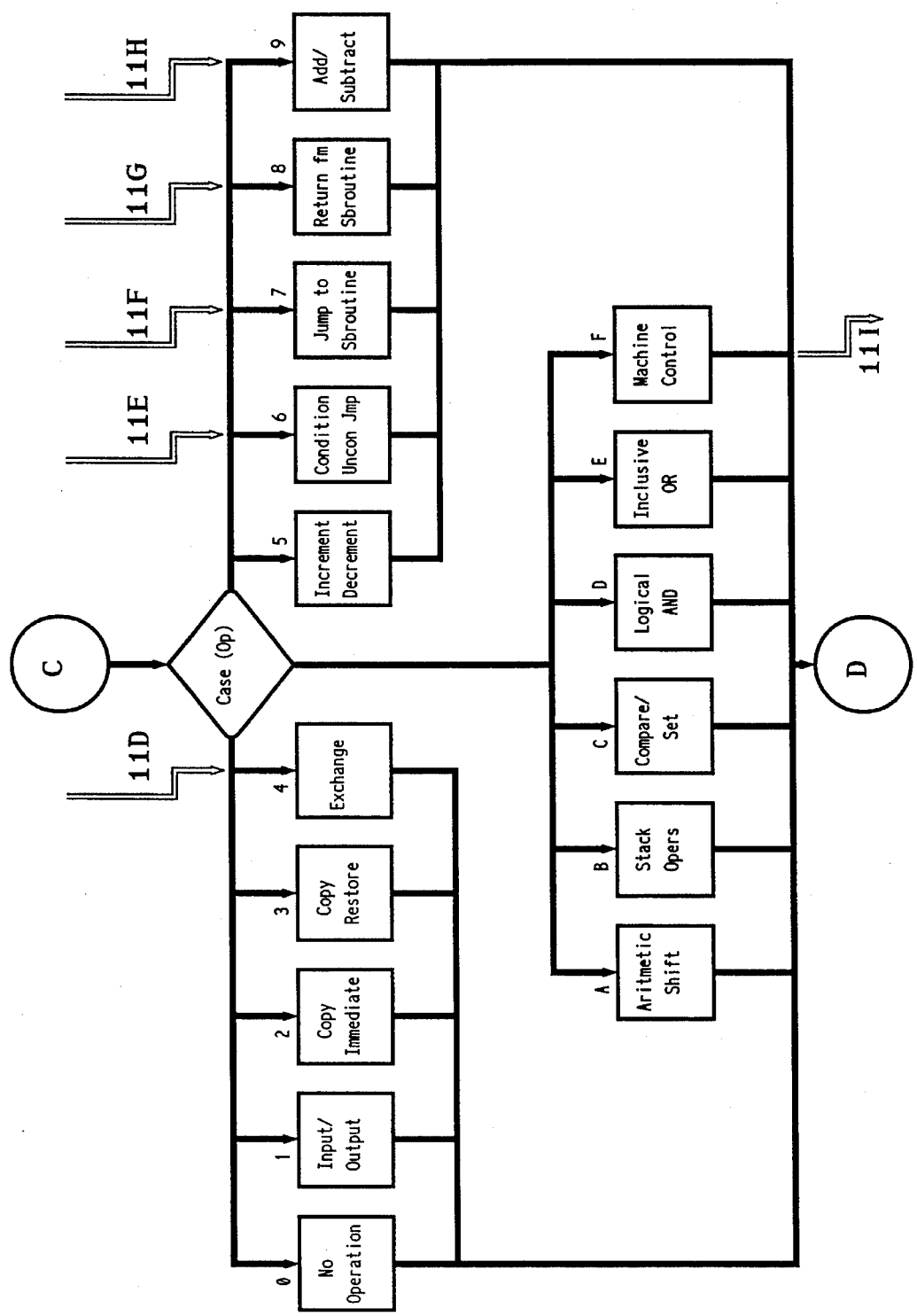
Figure 11D:
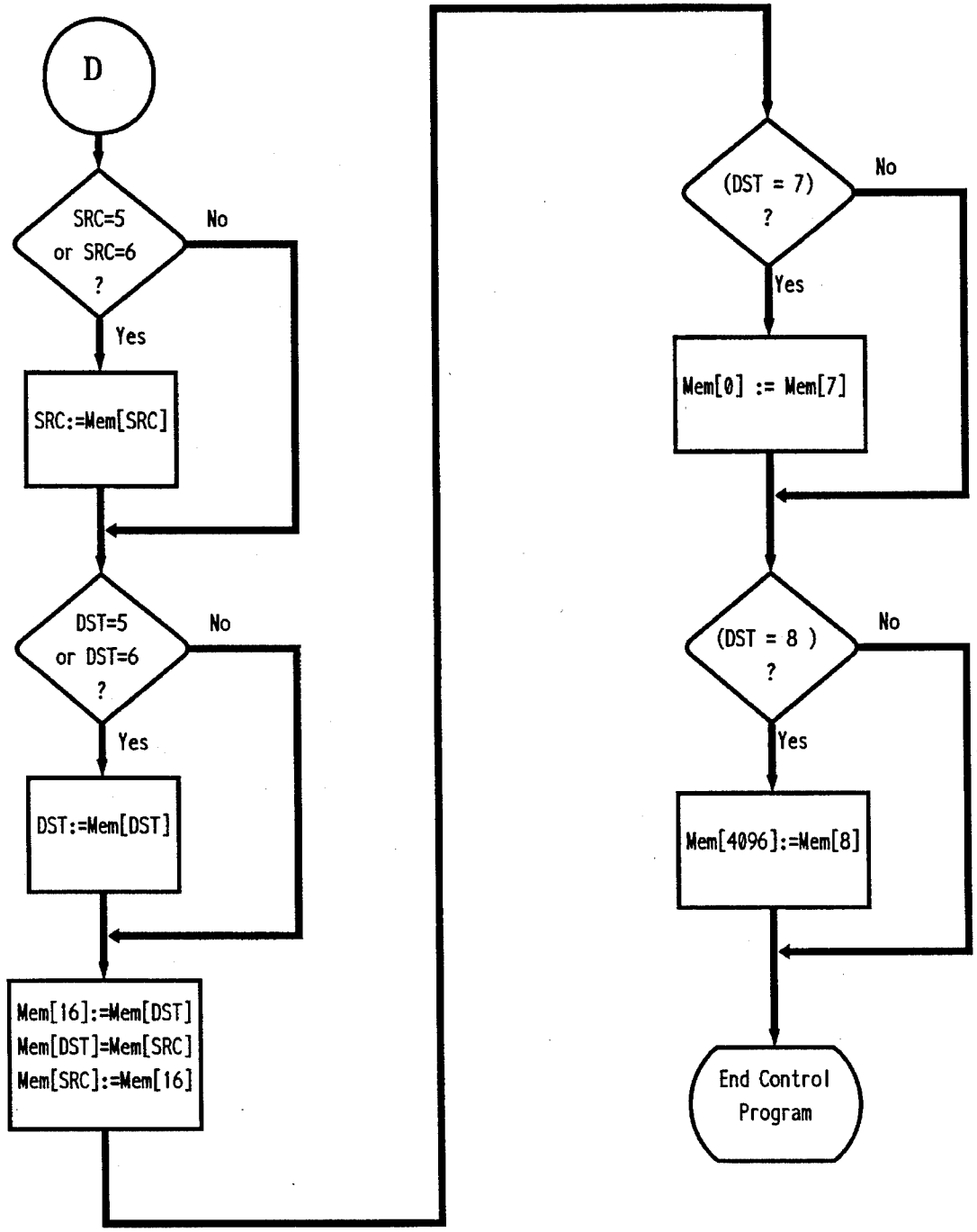
Figure 11E:
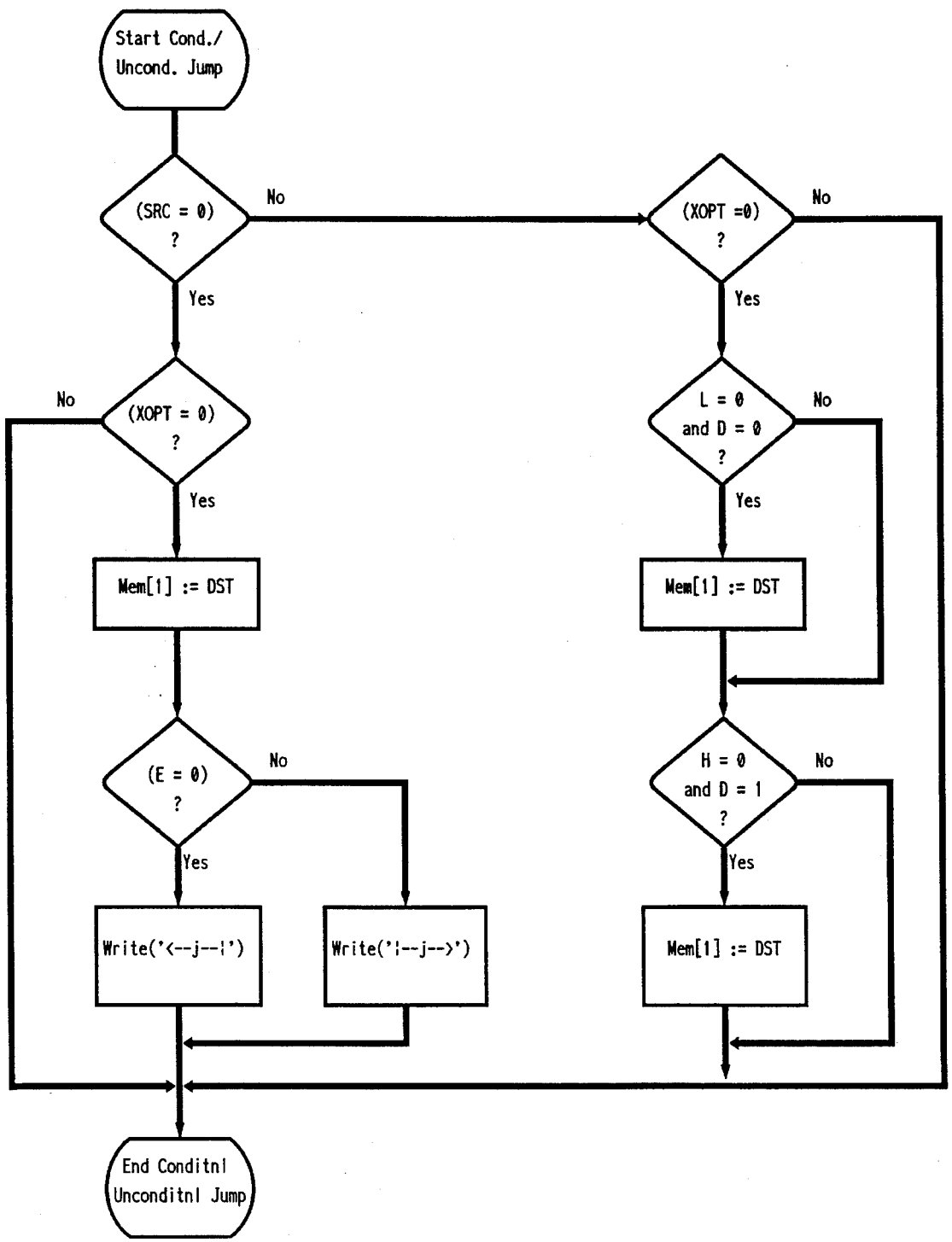
Figure 11F:
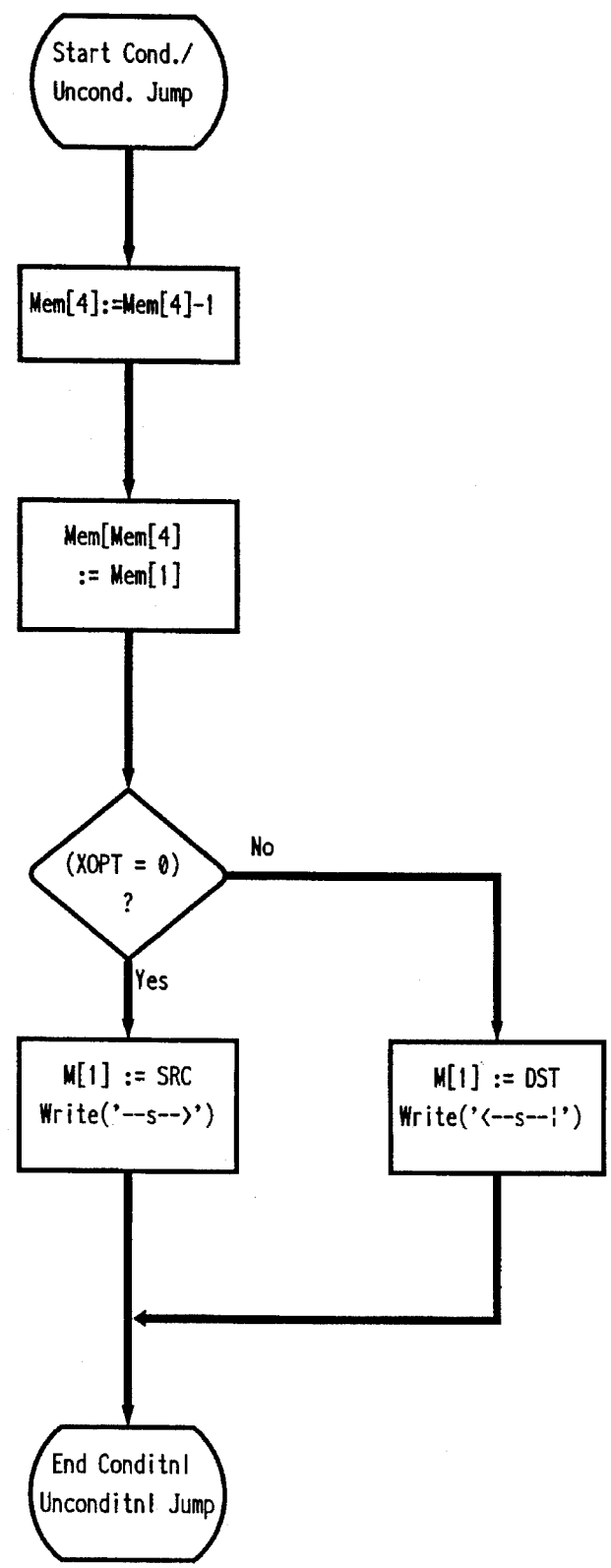
Figure 11G:
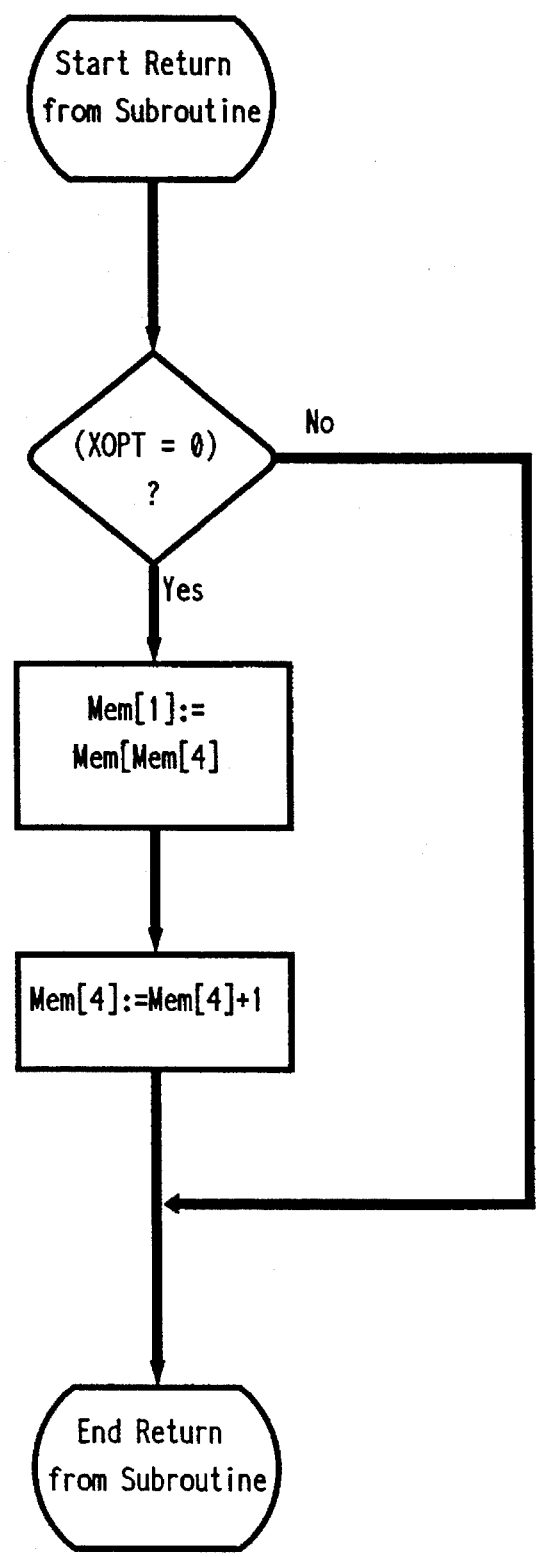
Figure 11H:
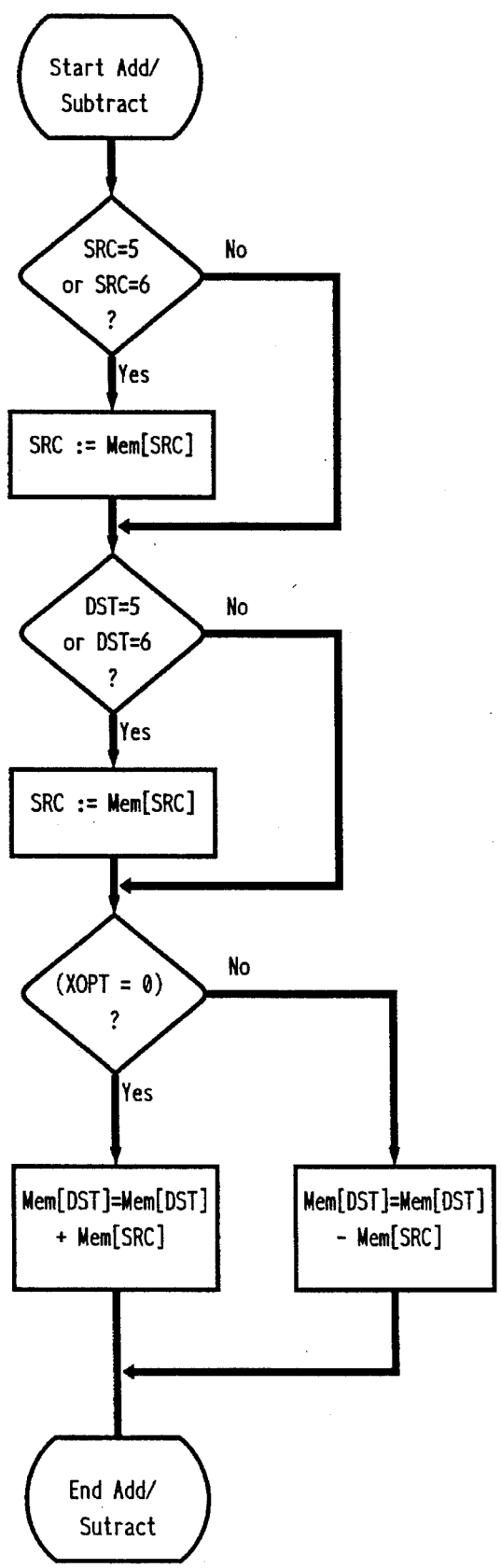
Figure 11I:
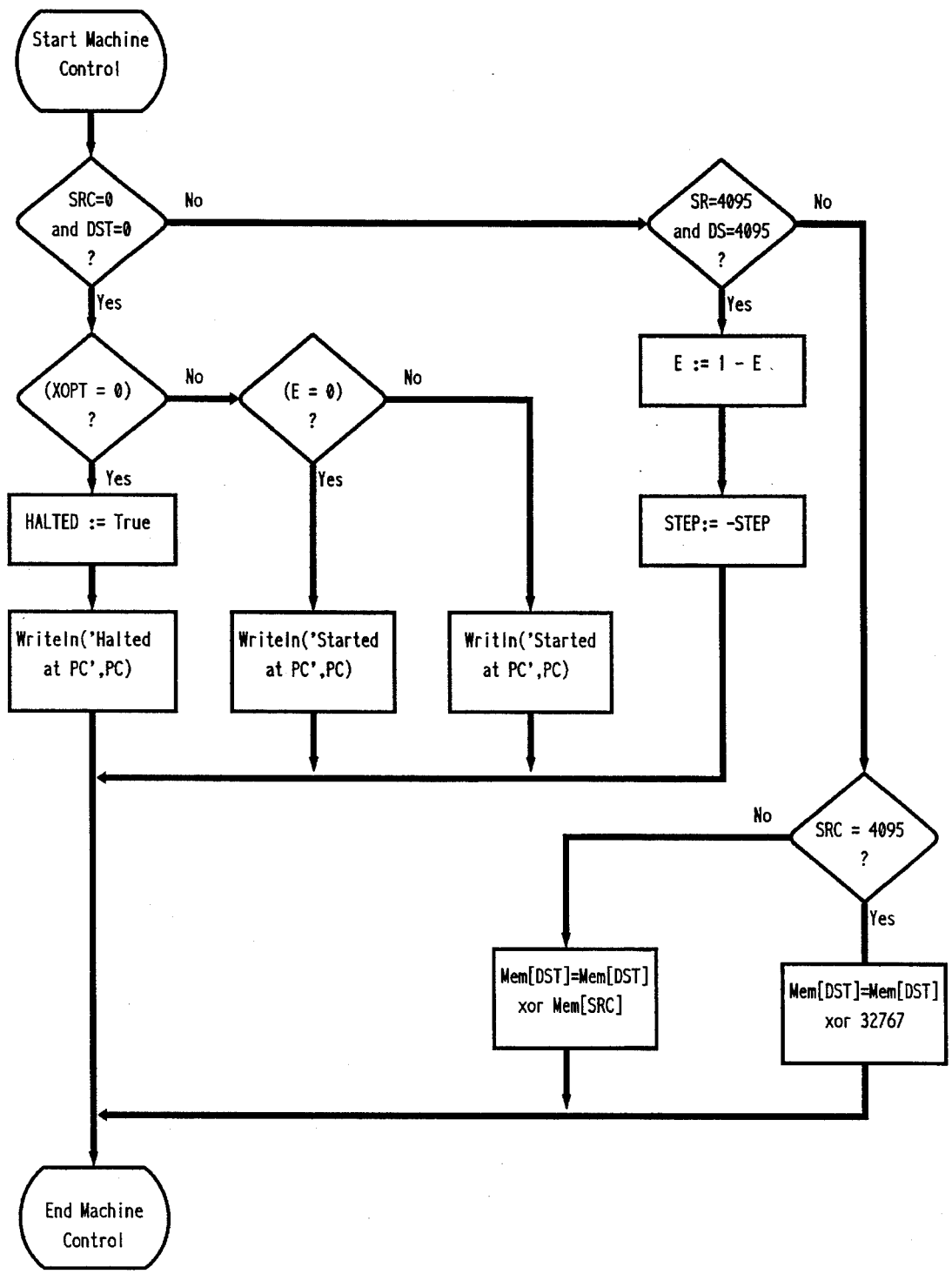

In a preferred embodiment of the reversible computer apparatus according to the invention, the software structure of which is illustrated schematically in FIG. 4, a sequential Von Neumann type processor architecture is employed. The invention also contemplates that a RISC architecture may be employed, such as that disclosed by Kane, G., *MIPS RISC Architecture*, Prentice-Hall, Englewood Cliffs, N.J. (1989), MIPS Comp. Systems, Inc. However, because the RISC design employs fewer simple instructions, development of sample programs to verify reversibility concepts is tedious. The details of the instruction set design scheme as employed in the Von Neumann type processor architecture in accordance with the invention are as follows.

A bit in the processor status (PS) register indicates whether the machine is in forward execution mode or reverse execution mode. The bit can be set or reset by external interrupts or internal traps caused by system calls. In forward mode, the program counter (PC) register is incremented after fetching an instruction, while in reverse mode the PC register is decremented after fetching the instruction. The instruction format allows for an instruction direction (or decoding direction) bit. If the direction bit is cleared (0), the instruction is to be decoded in its normal sense. If the direction bit is set (1), the instruction is to be decoded in its opposite sense. Accordingly, how an instruction will be executed depends upon exclusive-or (XOR)ing of the PS mode bit (0: forward, 1: reverse), with the instruction's sense bit (0: normal, 1: opposite). If the result of XOR is false (0), the operation is "native"; if the result of XOR is true (1), the operation is "nonnative."

Thus, in accordance with the foregoing, an increment (INC) operation in forward mode and a decrement (DCR) operation in reverse mode result in a native operation. Conversely, an INC in reverse mode and a DCR in forward mode result in a nonnative operation. However, a nonnative operation is not necessarily the opposite of a native operation. Typically, the nonnative operation is a "no operation" (NOP) for preserving the desired machine state in the execution flow.

The foregoing instruction set design scheme regards a pair of operations such as increment and decrement as one generic "step" operation. Whether the operation leaves a value incremented, decremented, or unchanged, will depend upon the XOR'ing of the flags as described above. In this manner, the size of the instruction set may be kept very small.

Generally, the instructions according to the invention comprise four parts: the op code, the source address of operant 1, the destination address of operant 2, and the instruction decoding sense flag (D flag). The D flag augments the op code and directs the decoding of the instruction in normal or opposite senses. The final operation depends upon the D flag as well as upon the execution mode (E flag of the PS register) as discussed above, i.e., XOR'ing of the D flag with the E flag of the PS register.

As in conventional designs, the PS register has other condition flags, as shown in FIG. 5. Of special import to the present invention are the E, F, X, H and L flags, which the control program implements. The other conventional flags of the PS register, including C (carry), V (overflow), etc., may be updated for purposes of completeness. The control program does not implement the P (parity) flag.

With reference to FIGS. 6A–6B, there are up to sixteen generic operation codes corresponding to the first hexadecimal digit Ø through F. The op code 0 is a NOP (no operation), while hex F (decimal 15) is HLT (halt). The opposite of HLT in forward mode is STA (start) in reverse mode, and vice versa.

Data transfer operations which do not require identical copies of data values (e.g., simple moves), are implemented as exchanges. Transfer operations requiring multiple copies of values are implemented as copy operations, which are regarded as data-destroying operations because the destination contents are overwritten. Examples include:

| | |
|---|---|
| EXC [src], [dst] | Exchange source and destination contents. |
| CPY [src], [dst] | Save value in src, then move value to dst. |

A variant of the CPY instruction, CPI src, [dst] (copy immediate) is used to conveniently initialize registers primarily for looping, i.e., as index or loop counters. Both CPY and CPI entail saving of the destination content in native mode and restoring it in nonnative mode. The exchange and copy instructions uniformly apply to register-register, register-memory operations, including LDA (load from memory) and STO (store into memory).

The input is performed by reading values from device addresses or from the keyboard into the AC register, after saving the AC content on the microstack (MIS). The opposite sense of the INP (input) instruction is the OUT (output) instruction which outputs the AC contents and restores it from the MIS. Although the control program may regard an input as destructive because the AC content is overwritten, the invention also contemplates embodiments in which the input is not considered destructive.

The unconditional jump and conditional branch operations include:

| | |
|---|---|
| JMP [src], [dst] | Jump to destination whenever source is 0. |
| BRA [src], [dst] | Branch to destination when source is not 0, and a condition flag (L or H) is clear. |

The L flag (result low) is raised when the result of the operation is zero, and is used in a manner similar to the conventional Z (result zero) flag. The H flag (result high) is raised when the result of the operation is equal to the value stored in the SRC field of the branch instruction (i.e., the DST is where the branch is made). These flags are updated only by the CMP [src], [dst] instruction (compare source content with destination content).

The jumps or branches occur only in native mode, i.e., when XOR'ing of the E and D flags yields 0 as described above. Otherwise, the operation STY (stay), which is essentially a NOP, is effected. Appropriate insertion of these branch instructions as markers in the machine language code implement the desired loops in forward and reverse modes.

The JSR instruction (jump to subroutine start or end) uses [src] as the start address and [dst] as the end address of the subroutine. The RTS instruction (return from subroutine) simply restores the PC to its previous contents that were saved on the stack before the subroutine jump. Calls from multiple sources are handled appropriately.

With the above-described branch and subroutine call constructs, the subroutines can be called (repeatedly if necessary) during forward operation mode, and retraced in an exactly opposite manner during reverse operation mode. An exemplary program with sample dialogue illustrating these concepts is shown in FIG. 7.

It will generally be understood that programming of the reversible processor according to the invention requires suitable placement (bracketing) of dual instructions with appropriate decodings for transfers of control as described hereinabove. The reversible design may be understood as generally discouraging the use of destructive operations, such that, for example, use of the copy instruction should be avoided unless it is necessary for the intended function. Where possible, the exchange (EXC) instruction should be used in order to alleviate the need for saving overwritten values on the MIS. As an alternative, the automatic save/restore feature can be disabled, with reliance instead upon the macrostack (MAS) in primary memory with more direct control.

The automatic saves feature on the MIS is optional, and may not be necessary. The choice to automatically save the overwritten values, or not, is implemented by the PS register F flag. As shown in FIG. 5, when cleared (F=0), automatic saves on the MIS occurs by default. If set (F=1), the overwritten destination contents involving data-destroying operations are not saved. This choice as to whether or not to save overwritten values is useful for implementing functions and their meaningful opposites in more general ways with respect to expected inputs and outputs.

The invention contemplates two main contexts of reversibility which vary as to scope and extent, including limited and normal contexts. The limited context is the conventional process context limited to the contents of the registers and the memory pointed to by the registers. The control program of the invention implements this context by asking for the value of the X flag of the PS register, which if set (X=1), causes the memory to be cleared whenever the execution mode (E bit) is modified. The limited context is useful for implementing functions and their opposites using the same code. The normal context involves the registers as well as primary memory and the micromemory contents associated with the MIS. The control program of the invention implements the normal context by asking for the value of the X flag in the PS register. If cleared (X=0), the memory is not cleared when the execution direction is reversed. The normal context is useful in conjunction with automatic saves/restores on the MIS via the PS flag F for recovery and rollbacks of the entire programming system.

FIGS. 11A–11I illustrate a flowchart for a master control program according to the invention, while Table I appended hereto sets out an exemplary program listing containing 585 lines of source code for the master control program.

With reference to FIGS. 8–10, exemplary reversible programs in accordance with the invention are described below. The various sample programs each employ integer arithmetic, with the main computational strategy entailing repeated additions for multiplication and repeated multiplication for powers of integers.

FIG. 8 relates to a reversible machine language program which adds up n integers. The integers may be input either interactively from the keyboard, or from lines of files, as desired. The program and a typical dialogue with five integers as input in the forward operational mode is shown in FIG. 8. A variant on this program accepted integers 1 through 50 from an input file and produced the sum 1275 in an output file. The run statistics involved 458 operations and resulted in a maximum stack size of 54. The micromemory overhead was thus $54/458=11.57\%$.

Other variants of the program shown in FIG. 8 include a program in which n identical integers of value m are each summed, giving the product p=n×m. This variant requires merely using the same indexed data piece instead of n distinct values, and requires one less instruction than the program described with reference to FIG. 8. An extension of the program described with reference to FIG. 8 multiplies two identical values, accepting a single input and multiplying it by itself. A test case with the number 66 as input and its square, 4356, as output, and vice versa, results in less than 1% of stack space overhead as opposed to the 11.57% overhead described with reference to FIG. 8.

In order to implement a single procedure for determining square roots of numbers known to be squares of whole numbers, and vice versa, the invention contemplates that a machine language program be used which in forward mode accepts any integer as input and gives its square as output. When run in reverse mode, the program accepts an integer known to be a square as input and produces its square root as output. The forward and reverse modes are combined back-to-back in a single program by partially merging and streamlining separate forward and reverse mode programs into as few source lines as possible without violating determinacy.

It will be understood from the foregoing that a reversible procedure according to the invention will at most be as big as two equivalent conventional one-way procedures. The degree of code space efficiency gained by careful merging of two back-to-back programs will depend on the nature of the function and the algorithm used for its implementation.

The invention further contemplates a reversible machine language program which takes two integers x and y as input and produces the result $p=x^y$. This program involves multiplying the number x by itself y times. In addition, the invention contemplates a program which takes an integer as input and raises it to the power of itself. For example, the program may be given the integer 5 as input and will produce $5^5=3125$ as output. In reverse operational mode, the program accepts 3125 as input and yields back the original input 5. This program was tested with arrowheads involving forward and reverse subroutine calls during the run, and faithfully retraced the statements and jumps during the reverse run.

FIGS. 9 and 10 relate to a further program in accordance with the invention which combines an ASCII-to-binary and binary-to-ASCII routine into a single program. Here, because the output is sufficient to reproduce the input, and vice versa, this function qualifies as perfectly reversible. Initially, a reversible program was tested for a specific conversion, e.g., letter A to binary 65 and vice versa. Thereafter, by disabling the automatic data saves on the microstack in accordance with the option therefor, the program was generalized to accept any string of four octal digits in ASCII and output the binary number (actually decimal) as its equivalent. FIG. 9 illustrates how the generalized routine works, and demonstrates that the program is not restricted to a specific ASCII or decimal input and its corresponding output. Rather, the reversible program functions for any ASCII string-binary value pair. FIG. 10 illustrates the program, whereby a single procedure performs both conversions.

It will be understood from the foregoing that in accordance with the invention reversibility is made feasible at a practical level. Costs involved for extra memory to save information associated with data-destroying operations is modest as compared with the far reaching benefits of affording a reverse execution mode in addition to the standard forward execution mode. It is contemplated that a reversible processor as described is capable of any type of computation that its conventional one-way counterpart can perform.

While there have been described hereinabove what are at present considered to be the preferred embodiments of the invention, it will be understood that various modifications may be made therein without departing from the spirit and scope of the invention. The present embodiments are therefore to be considered in all respects as illustrative, and not restrictive. The scope of the invention is indicated by the appended claims rather than by the foregoing description.

TABLE I

PROGRAM LISTING FOR MASTER CONTROL PROGRAM
(585 Lines of Source Code)
==================================================================

```
                (INPUT,OUTPUT,PROG,IFIL,OFIL,LOG);
label   error, quit;
const
    START_ADDRESS = 1;

type
    LONGSTR = STRING[40];
    STRINGS = STRING[10];

INSTRUCTION = record
                  LOC : STRING[5];
                  COD : STRINGS;
                  REM : LONGSTR
    end;        { INSTRUCTION }

STACKPOINTER = ^STACKNODE;
    STACKNODE    = record
                     DATA : INTEGER;
                     LINK : STACKPOINTER
    end;        { STACKNODE } var
    PROG, IFIL, OFIL, LOG : TEXT;
    MACH_PROG: ARRAY[1..256] OF INSTRUCTION;
    M: ARRAY[0..4096] OF INTEGER;
   (*NOTE:   INP: ARRAY[1..256] OF INTEGER;
             OUT: ARRAY[1..256] OF INTEGER;
             ICOUNT, OCOUNT: INTEGER;  *)

P, V, C, X, H, L, F, E : INTEGER;   { processor status flags }
    END_ADDRESS, XOPT, STEP : INTEGER;
    I, J, T : INTEGER;
    R, PCT : REAL;
    PCOUNT, SCOUNT, PSH_COUNT, POP_COUNT, MAX_SIZE: INTEGER;
    ANS: CHAR;
    OP: CHAR;
    SRC, DST, D : INTEGER;
    COMMENT: LONGSTR;
    TOP: STACKPOINTER;

PC, PS, AC, SP, XX, YY, WW, ZZ, TI : INTEGER; { register mneumonics }
    TMP, ERRCODE: INTEGER;
    OPER_COUNT: ARRAY [1..4] OF INTEGER;
    TMPS, PROG_NAME: STRINGS;
    IOS: STRING[5];
```

{--------------------- Procedures ---------------------------------}

```
procedure PUSH (NEXTNUM {inp}: INTEGER ; VAR TOP {out} : STACKPOINTER);
{pushes data in NEXTNUM unto the top of stack pointed to by TOP }
var
    TEMP: STACKPOINTER;

begin (PUSH)
    PSH_COUNT := PSH_COUNT + 1;
    NEW(TEMP);              ( point TEMP to a new node  )
    TEMP^.DATA := NEXTNUM;  ( save the next string      )
    TEMP^.LINK := TOP;      ( connect it to the old top )
    TOP := TEMP             ( redefine top of the stack )
end; {PUSH} function EMPTYSTACK(TOP: STACKPOINTER) : BOOLEAN; {true if stack empty}
begin
    EMPTYSTACK := TOP = NIL
    end;      {EMPTYSTACK} procedure POP (var ITEM {out}: INTEGER; var TOP (in/out): STACKPOINTER);
var
    TEMP: STACKPOINTER;

begin ( POP )
if EMPTYSTACK(TOP) then
    WRITELN('stack underflow error ')
else begin
    POP_COUNT := POP_COUNT + 1;
    ITEM := TOP^.DATA;    ( get ITEM )
    MARK(TEMP);
    TOP := TOP^.LINK;     ( reset TOP )
    RELEASE(TEMP);
    end
end;   {POP} procedure STORE (VAR IFILE: TEXT; VAR TALLY: INTEGER);
var
    K: INTEGER;
begin
RESET(IFILE);
K := 0;
while not EOF (IFILE) do
    begin
    K := K + 1;
    with MACH_PROG[K] do
        begin
        READLN(IFILE,LOC,COD,REM);
        if COD = 'F000000000' then END_ADDRESS := K
        end
    end;        ( while part )
    TALLY := K;
```

```
    end;      ( STORE )

procedure DECODE (CODE: STRINGS; VAR OP: CHAR; var SRC,DST,D: INTEGER);
begin
    OP := CODE[1];
    VAL (COPY(CODE,2,4),SRC,ERRCODE);
    VAL (COPY(CODE,6,4),DST,ERRCODE);
    VAL (COPY(CODE,10,1),D,ERRCODE);
    if ERRCODE <> 0 then
        begin
        ERRCODE := 99;
        WRITELN('non-numeric code string');
        end
end;      ( DECODE )

{=================== mainline ===================================} var
    HALTED: BOOLEAN;

begin           (CONTROL PROGRAM)

TOP := NIL;   ( initialize top of the stack to empty )
MAX_SIZE := 0; PSH_COUNT := 0; POP_COUNT := 0;

WRITE ('Machine language program name -- [maxlength 10]? ');
READLN(PROG_NAME);

ASSIGN(PROG, PROG_NAME);
ASSIGN(LOG,'log.dat');

STORE(PROG,PCOUNT);          ( read program into memory )

{LOADINP(IFIL,ICOUNT); LOADOUT(OFIL,OCOUNT); }
{reserved for future input-output capability in the wide context}

REWRITE(LOG);                ( prepare log for output messages )
WRITELN(LOG, '  ******    LOG OF RUN-TIME MESSAGES  ************');
WRITELN(LOG);

{Initialize the registers and the primary memory: }
for I := 0 to 4095 do M[I] := 0;   ( init registers and memory )
M[4] := 4095;                       ( initialize stack pointer   )
M[M[4]] := -1;                      ( mark the bottom of stack   )
SP := M[4];                         ( save the stack pointer     )
P:=1; V:=0; C:=0; X := 1; H:=0; L:=0; F := 0; E:=0; (init CC flags )
for I := 1 to 4 do  OPER_COUNT[I] := 0;  ( initialize oper counts )
WRITELN(PCOUNT, '  instructions loaded into program memory');
WRITELN('Start address: ',START_ADDRESS,' End address: ',END_ADDRESS);

repeat                              ( until the user gets tired )
```

```
WRITE ('execute forward (0) or reverse (1)?   ');
READLN (E);
if (E <> 0) and (E <> 1) then
    begin
    ERRCODE := 88;
    WRITELN ('invalid execution code!')
    end;

WRITE ('set save mode (0) or flush mode (1)?   ');
READLN (F);
WRITE ('context normal (0) or limited (1)?    ');
READLN (X);

HALTED := FALSE;
if E = 0 then
    begin
    M[1] := START_ADDRESS;
    STEP := +1;
    ASSIGN(IFIL,'ifil.dat');
    ASSIGN(OFIL,'ofil.dat')
    end
else begin
    M[1] := END_ADDRESS;
    STEP := -1;
    ASSIGN(IFIL,'ofil.dat');
    ASSIGN(OFIL,'ifil.dat')
    end;
RESET(IFIL);   REWRITE(OFIL);   REWRITE(LOG);

M[2] := 10000*X + 1000*H + 100*L + 10*F + E; { Form PS Register } if X = 1 then                            { set up the context        }
    begin
    for I := 17 to (SP-1) do             { re-initialize data memory }
        begin
        M[I] := 0                        { clear non-indexed locations }
        end
    end;                                 { setting up the context    } while NOT HALTED do   { fetch, decode, stepPC, execute } begin
    PC := M[1];                          { fetch from program memory }
    M[1] := M[1] + STEP;                 { step the program counter  }
    DECODE (MACH_PROG[PC].COD,OP,SRC,DST,D); {decode instruction}
    COMMENT:=MACH_PROG[PC].REM;{get the comment line of mach code}
    XOPT := E xor D;

{WRITELN;  Debugging statements commented for final version:
    WRITELN('PC=',PC,' ',OP:1,' ',SRC:4,' ',DST:4,' ',COMMENT);
    WRITE(PC:2);  WRITE(CHR(08));  WRITE(CHR(08));}
```

```
case OP of        ( Instruction executions )

'0': begin
        (WRITELN('no operation ');)
        end;

'1': begin
        (WRITELN('input/output operations ');)
        if XOPT = 0 then
            begin                           ( input operations   )
            if F = 0 then PUSH(M[3],TOP);

if DST = 0 then                 ( input from the CRT terminal)
                begin
                WRITELN;
                WRITE('input? ');
                READLN(IOS);                ( get value interactively )
                end
            else  begin                     ( input from a disk file  )
                READLN(IFIL,IOS)            ( read from default input file)
                end;
            VAL(IOS,M[3],ERRCODE)
        end
        else begin                          ( output operations       )
            STR(M[3],IOS);
            if DST = 0 then
                begin
                WRITELN;
                WRITE('output ',IOS); ( write accumulator contents )
                READLN(TMP)
                end
            else begin
                WRITELN(OFIL,IOS) ( write to default output file )
                end;

if (F = 0) and (NOT EMPTYSTACK(TOP)) then POP(M[3],TOP)
            end          ( else part for output operations )
        end;

'2': begin
        (WRITELN('Copy Immediate Operation ');)

if XOPT = 0 then                    ( copy source address to dst )
            begin
            if (F = 0)  then PUSH(M[DST],TOP); ( save dest  )
            M[DST] := SRC
            end
        else begin                          ( simply restore destination )
            if (F = 0) then
                begin
                if NOT EMPTYSTACK(TOP) then POP(M[DST],TOP) ( restore )
                end
```

```
                end;
            if DST = 7 then M[0] := SRC;
        end;

'3': begin
           {WRITELN('copy/restore operations ');} if (SRC = 5) or (SRC = 6) then SRC := M[SRC];   { indexing with XX }
           if (DST = 5) or (DST = 6) then DST := M[DST];   { indexing with YY } if XOPT = 0 then               ( native mode )
               begin
               if (F = 0)  then PUSH(M[DST],TOP);  { save destination }
               M[DST] := M[SRC]           { copy source to destination }
               end
           else begin                     ( non-native mode)
               {M[SRC] := M[DST];    copy dst to src }
               if (F = 0)  then
                   begin
                   if NOT EMPTYSTACK(TOP) then POP(M[DST],TOP)  { restore }
                   end
               end                        ( non-native part )
        end;

'4': begin
           {WRITELN('exchange (one time move) operations ');} if (SRC = 5) or (SRC = 6) then SRC := M[SRC];{indexing with XX}
           if (DST = 5) or (DST = 6) then DST := M[DST];{indexing with YY}
           { Regardless of mode:   src <-> dst }
               M[16]  := M[DST];
               M[DST] := M[SRC];
               M[SRC] := M[16];

if (DST=7) then M[0]    := M[7];     ( set WW register R0 )
           if (DST=8) then M[4096] := M[8];     ( set ZZ register RFFF )
        end;

'5': begin
           {WRITELN('increment/decrement operations ');}
           if XOPT = 0 then  M[DST] := M[DST] + 1
           else              M[DST] := M[DST] - 1;
        end;

'6': begin
           {WRITELN('unconditional and conditional jump operations ');}
           if SRC = 0 then
               begin                  ( unconditional jump operations    )
               if XOPT = 0 then    ( native mode: jump unconditionally )
                   begin
                   M[1] := DST;    ( jump to destination address )
```

```
                    if E = 0 then WRITE(' |--j--> ')
                    else          WRITE(' <--j--| ');
                    end
             else ;                   ( dont jump, stay!...    )
             end
       else begin                 ( conditional branch operations )
             if XOPT = 0 then  ( native mode: jump if result not zero )
                begin
                if (L = 0) and (D = 0) then M[1] := DST;
                if (H = 0) and (D = 1) then M[1] := DST;
                {*if E = 0 then WRITE(' ^ ') else WRITE(' v ');*}
                end
             else ;               ( stay in nonnavite mode  )
             end                  ( conditional branch operations )
       end;

'7': begin
       (WRITELN('jumps to subroutines');)
       M[4] := M[4] - 1;      ( push current addresss )
       M[M[4]] := M[1]; ( correct return address M[1]+STEP when popped)
       if XOPT = 0 then        ( native mode              )
             begin
             M[1] := SRC;     ( jump to subroutine start)
             WRITE(' |--s--> ')
             end
       else begin                     ( non-native mode  )
             M[1] := DST;            ( jump to subroutine end )
             WRITE(' <--s--| ')
             end
     end;

'8': begin
       (WRITELN('returns from subroutines');)
       if XOPT = 0 then            ( native mode )
             begin
             M[1] := M[M[4]];        ( pop return address )
             M[4] := M[4] + 1
             end
       else ;                       ( just stay don't return )
     end;

'9': begin
       (WRITELN('add/subtract operations ');)
       if (SRC = 5) or (SRC = 6) then SRC := M[SRC];{indexing with XX}
       if (DST = 5) or (DST = 6) then DST := M[DST];{indexing with YY} if XOPT = 0 then
             begin
             M[DST] := M[DST] + M[SRC]        ( add in native mode )
             end
       else begin
             M[DST] := M[DST] - M[SRC]   ( subtract in non-native mode )
```

```
                end
            end;

'A': begin
         {WRITELN('arithmetic shift operations ');}
         if XOPT = 0 then
                begin
                M[DST] := M[DST] shl 1;    {shift left in native mode }
                if M[DST] >32767 then
                      begin
                      V := 1;
                      WRITELN('mdst= ',M[DST],' overflow on shift left!')
                      end
                end
            else begin
                if (M[DST] mod 2) <> 0 then
                      begin
                      WRITELN('mdst= ',M[DST],' underflow on shift right!');
                      V := 1
                      end;
                M[DST] := M[DST] shr 1 {shift right non-native mode }
                end
         end;

'B': begin
         {WRITELN('stack operations ');}
         if M[4] < 3072 then
                begin
                ERRCODE := 10;
                WRITELN('stack overflow! ',M[4]);
                end
            else if M[4] > 4095 then
                    begin
                    ERRCODE := 11;
                    WRITELN('stack underflow! ',M[4])
                    end
                else begin
                    if XOPT = 0 then
                         begin
                         M[4] := M[4] - 1;     { decrement stack pointer }
                         M[M[4]] := M[DST]     { push unto in native mode }
                         end
                    else begin
                         M[DST] := M[M[4]];    { pop in non-native mode }
                         M[4] := M[4] + 1
                         end
                    end
         end;

'C': begin
         {WRITELN('compare and set flags ');}
         if (XOPT = 0) or (XOPT = 1) then
```

```
            begin                       { set H, L, V in native mode }
            M[16] := M[SRC] - M[DST]; ( get result in temporary reg   }
            if M[DST] = 0 then L := 1 else L := 0;
            if M[DST] = M[SRC] then H := 1 else H := 0;
            if (M[16] > 32767) or (M[16] < -32767) then V:=1 else V:=0
            end
      else ;                            { do nothing whatsoever }
      end;                  { operation code C for compares flags }

'D': begin
      {WRITELN('Logical AND operations ');}
      if XOPT = 0 then                 { BIC: Bit Clear from Source }
         begin
         if (F = 0) then PUSH(M[DST],TOP); ( save destination }
         M[DST] := M[DST] and M[SRC];
         end
      else begin
         if (F = 0)   then
               begin
               if NOT EMPTYSTACK(TOP) then POP(M[DST],TOP) {restore}
               end
         end
      end;

'E': begin
      {WRITELN('Inclusive OR operations ');}
      if XOPT = 0 then                 { BIS: Bit Set from Source }
         begin
         if (F = 0) then PUSH(M[DST],TOP); ( save old value }
         M[DST] := M[SRC] or M[DST]
         end
      else begin                       { BIS: Bit Set from Destination }
         if (F = 0)   then
               begin
               if NOT EMPTYSTACK(TOP) then POP(M[DST],TOP) {restore}
               end
         end
      end;

'F': begin
      {WRITELN('machine control operations ');}
      if (SRC = 0) AND (DST = 0) then
         begin                         ( machine control operations }
         if XOPT = 0 then
               begin
               HALTED := TRUE;
               WRITELN;
               WRITELN('Halted at PC ',PC:3,' <^>');
               end
         else begin
               if E = 0 then
                    WRITELN('Started at PC ',PC:3,' ->== Forward ==->')
```

```
                        else WRITELN('Started at PC ',PC:3,' <-== Reverse ==-<')
                      end
                    end else begin                    ( augmented operations     )
              if (SRC = 4095) and (DST = 4095)  then ( special situation ! )
                  begin                 ( reset E flag         )
                  E := 1 - E;
                  STEP := - STEP
                  end                   ( reset E flag operation   )
              else begin                ( logical operations        )
                  if (SRC = 4095) then
                      M[DST] := M[DST] xor 32767      ( bitwise NOT )
                  else M[DST] := M[DST] xor M[SRC];   ( bitwise XOR )
                  end                   ( logical operations        )
              end                       ( augmented operations      )
        end                             ( op code F simulation      )
    end;                                ( big case for 16 op codes  )

if E = 0 then OPER_COUNT[1] := OPER_COUNT [1] + 1
    else OPER_COUNT [2] := OPER_COUNT [2] + 1;

if XOPT = 0 then OPER_COUNT[3] := OPER_COUNT[3] + 1
    else OPER_COUNT[4] := OPER_COUNT[4] + 1;

TMP := PSH_COUNT - POP_COUNT;
    if MAX_SIZE  < TMP then MAX_SIZE := TMP;

end;                   ( the big do while              )

{('*** one execution sequence ended now ***'); }

M[2] := 10000*X + 1000*H + 100*L + 10*F + E;   (status register )
SP := M[4];                            ( better save the stack pointer  )
WRITELN;
WRITELN ('     Generating log file LOG.DAT for ',PROG_NAME,'  Please Stand
By...');
WRITELN;
WRITELN(LOG,'  <<<<<< STATISTICS FOR MACHINE LANGUAGE PROGRAM  ',PROG_NAME, '
>>>>>>');
WRITELN(LOG);
WRITELN(LOG,'instruction counts:');
W    R    I    T    E    L    N    (    L    O    G    ,         '
_____');
WRITE(LOG,'  |forward execution count: ',OPER_COUNT[1]:5);
WRITELN(LOG,'  | native operation count:    ',OPER_COUNT[3]:5,'   |');
WRITE(LOG,'  |backwrd execution count: ',OPER_COUNT[2]:5);
WRITELN(LOG,'  | nonnative operation count:  ',OPER_COUNT[4]:5,'   |');
W    R    I    T    E    L    N    (    L    O    G    ,         '
|_____|_____|');
WRITE(LOG,'  |number of instructions:  ',OPER_COUNT[1]+OPER_COUNT[2]:5);
WRITELN(LOG,'  |                          ',OPER_COUNT[3]+OPER_COUNT[4]:5,'
```

```
                                                  |');
W      R      I      T      E      L      N      (      L      O      G            ,          '
|_____|                              |_____|');

WRITELN(LOG);
WRITELN(LOG,'register contents: ');
WRITELN(LOG,'            _____');

WRITELN(LOG,'           |  PC = ',M[1]:5,'    PS = ',M[2]:5,'    AC = ',M[3]:5,'
  SP = ',M[4]:5,'  |');
WRITELN(LOG,'           |  XX = ',M[5]:5,'    YY = ',M[6]:5,'    R7 = ',M[7]:5,'
  R8 = ',M[8]:5,'  |');
WRITELN(LOG,'           |  R9 = ',M[9]:5,'    RA = ',M[10]:5,'   RB = ',M[11]:5,'
  RC = ',M[12]:5,' |');
WRITELN(LOG,'           |  RD = ',M[13]:5,'   RE = ',M[14]:5,'   RF = ',M[15]:5,'
  TI = ',M[16]:5,' |');
WRITELN(LOG,'           |_____|');

WRITELN(LOG);

WRITELN(LOG,'nonzero data memory: ');
WRITELN(LOG,'           _____');
WRITELN(LOG,'          |    LOC       CONTENT   |');
WRITELN(LOG,'          |    -----     -------   |');
for J := 17 to (SP-1) do
    begin
    if M[J] > 0 then WRITELN(LOG,'          |    ',J:4,':      [',M[J]:5,']      |')
    end;
WRITELN(LOG,'          |_____|');
WRITELN(LOG);

WRITELN('MAcroStack: ');
WRITELN('     SP        CONTENT');
WRITELN('    ------     -------');
for J := SP to 4095 do
    begin
    I := J;
    WRITELN('    ',I:4,':      [',M[I]:5,']')
    end;
WRITELN;

CLOSE(OFIL);   CLOSE(IFIL);
REWRITE(OUTPUT);

WRITELN(LOG,'MIcroStack:    ');
WRITELN(LOG);

SCOUNT := 0;    { initialize micromemory stack size }
while not EMPTYSTACK(TOP) do        { dump out internal stack }
    begin
    POP (TMP,TOP);
```

```
         WRITELN(LOG,'    |\ _____ ',TMP:4,'_____ /|');
         SCOUNT := SCOUNT + 1;
      end;                           ( while )
WRITELN(LOG,'            |~~~~~~~~~~~~~~~~~~~~~~~~~~~~~~|');
if SCOUNT = 0 then WRITELN('         |------------ EMPTY ----------|')
else               WRITELN('         |------------------------------|');

(* final adjustments and statistics *)
POP_COUNT := POP_COUNT - SCOUNT;       ( adjust for MAX_COUNT )
TMP := OPER_COUNT[1] + OPER_COUNT[2];
T   := OPER_COUNT[3] + OPER_COUNT[4];
if T <> TMP then WRITELN('Inconsistent Instruction and Operation Counts!');
PCT := (MAX_SIZE * 100) / T;
WRITELN('MIcroStack Size: ',SCOUNT:4,' |-- Max Stack Size= ',MAX_SIZE:3,
   ' | Max_MIS / Op_count: ',PCT:6:2,' % |');
WRITELN;
CLOSE(LOG);
WRITE ('Continue (Y/N)? ');
READLN(ANS);
until (UPCASE(ANS) = 'N');

(********* simulator finished up here *******************)

quit:   WRITELN;
        if ERRCODE = 0   then
             WRITELN('program successfully completed!')
        else WRITELN('Program terminated...error code = ',ERRCODE);
CLOSE(LOG);
CLOSE(OUTPUT);
end.            (CONTROL PROGRAM)
```

I claim:

1. A reversible computer apparatus capable of executing instructions in both a forward execution mode and a reverse execution mode wherein some data values are overwritten in said forward execution mode, said reversible computer apparatus comprising:

microprocessor means having a plurality of registers;

microinstruction program memory and data memory;

said microinstruction program memory being programmed at a microprogramming level to incorporate an instruction set comprising a plurality of forward execution instructions and complementary reverse execution instructions, wherein a complementary reverse execution instruction is paired with each said forward execution instruction, each said reverse execution instruction being of opposite sense relative to its paired forward execution instruction;

stack means for saving only selected data values out of all data values overwritten during said forward execution mode; and said microinstruction program memory being further programmed such that said apparatus is selectively operable in said forward execution mode which implements said forward execution instructions in a forward logical flow, and said reverse execution mode which implements said reverse execution instructions in a reverse logical flow which is substantially the opposite of said forward logical flow, wherein said microprocessor reverses execution of each said forward execution instruction by executing its complimentary paired reverse execution instruction, wherein after execution of each said reverse execution instruction all said data values overwritten by its paired forward execution instruction are restored to the state prior to execution of said paired forward execution instruction.

2. A reversible computer apparatus according to claim 1, wherein:

said stack means comprises an internal stack formed as part of said machine language design in said program memory of said apparatus, which automatically saves data before destructive operations in said forward execution mode.

3. A reversible computer apparatus according to claim 1, wherein:

said stack means comprises an internal stack which selectively automatically saves data;

said microprocessor means includes an internal stack pointer register for implementing said internal stack.

4. A reversible computer apparatus according to claim 1, wherein:

exchange instructions are employed to swap data items during input and output operations involving data transfers between primary and secondary memory means of said apparatus.

5. A reversible computer apparatus according to claim 1, wherein:

said instruction set comprises pairs of complementary forward and reverse execution instructions for implementing unconditional jumps, conditional branches, subroutine calls and returns from subroutines.

6. A reversible computer apparatus according to claim 1, wherein:

said apparatus employs a sequential Von Neumann type processor architecture.

7. A reversible computer apparatus according to claim 1, wherein:

said instructions of said instruction set each include an operation code, a source address, a destination address, and an instruction decoding sense flag.

8. A reversible computer apparatus capable of executing instructions in both a forward execution mode and a reverse execution mode wherein some data values are overwritten in said forward execution mode, said reversible computer apparatus comprising:

program memory and data memory;

said program memory being programmed at a machine language level to incorporate an instruction set comprising a plurality of forward execution instructions and complementary reverse execution instructions, wherein a complementary reverse execution instruction is paired with each said forward execution instruction, each said reverse execution instruction being of opposite sense relative to its paired forward execution instruction;

stack means for saving only selected data values out of all data values overwritten during said forward execution mode; and said program memory being further programmed such that said apparatus is selectively operable in said forward execution mode which implements said forward execution instructions in a forward logical flow, and said reverse execution mode which implements said reverse execution instructions in a reverse logical flow which is substantially the opposite of said forward logical flow, wherein said reversible computer reverses execution of each said forward execution instruction by executing its complimentary paired reverse execution instruction, wherein after execution of each said reverse execution instruction all said data values overwritten by its paired forward execution instruction are restored to the state prior to execution of said paired forward execution instruction.

9. A reversible computer apparatus according to claim 3, wherein:

said microprocessor means further includes a processor status register; and said internal stack is enabled and disabled via a flag in said processor status register so as to selectively automatically save data.

* * * * *